United States Patent
Leung et al.

(10) Patent No.: US 6,775,043 B1
(45) Date of Patent: Aug. 10, 2004

(54) REFLECTOR ASSEMBLIES FOR OPTICAL CROSS-CONNECT SWITCHES AND SWITCHES FABRICATED THEREFROM

(75) Inventors: Chak Leung, Palo Alto, CA (US); Kent Leung, Moraga, CA (US); Dar-Qwei (David) Fuh, San Jose, CA (US); Stanley Yu, Campbell, CA (US); Howie Trang, San Jose, CA (US)

(73) Assignee: Blue Sky Research, Milpitas, CA (US)

( * ) Notice: Subject to any disclaimer, the term of this patent is extended or adjusted under 35 U.S.C. 154(b) by 285 days.

(21) Appl. No.: 09/811,834

(22) Filed: Mar. 16, 2001

(Under 37 CFR 1.47)

Related U.S. Application Data

(63) Continuation-in-part of application No. 09/643,198, filed on Aug. 21, 2000, now abandoned.

(51) Int. Cl.[7] .............................. G02B 26/08; G02B 6/26
(52) U.S. Cl. ...................... 359/224; 359/290; 359/291; 359/298; 385/14; 385/16; 385/17; 385/18
(58) Field of Search ................................. 359/196–199, 359/201–203, 212–214, 223, 224, 226, 290–292, 295, 298; 385/14, 16–18, 25, 42, 47; 398/45, 55, 56, 82

(56) References Cited

U.S. PATENT DOCUMENTS

| | | | |
|---|---|---|---|
| 5,168,535 A | | 12/1992 | Laor .............................. 385/16 |
| 5,177,348 A | | 1/1993 | Laor ........................ 250/201.1 |
| 5,524,153 A | | 6/1996 | Laor .............................. 385/16 |
| 5,579,148 A | * | 11/1996 | Nishikawa et al. .......... 359/214 |
| 5,581,414 A | | 12/1996 | Snyder ......................... 359/819 |
| 5,754,330 A | * | 5/1998 | Nam ........................... 359/291 |
| 6,044,705 A | * | 4/2000 | Neukermans et al. ..... 73/504.02 |
| 6,337,760 B1 | * | 1/2002 | Huibers et al. .............. 359/291 |
| 6,366,715 B1 | * | 4/2002 | Wang ........................... 385/17 |
| 6,381,387 B1 | * | 4/2002 | Wendland, Jr. ............... 385/37 |
| 6,396,975 B1 | * | 5/2002 | Wood et al. ................... 385/18 |
| 6,445,842 B1 | * | 9/2002 | Dhuler et al. ................. 385/17 |
| 6,490,382 B1 | * | 12/2002 | Hill .............................. 385/17 |
| 6,519,074 B2 | * | 2/2003 | Little et al. .................. 359/290 |
| 2002/0071166 A1 | * | 6/2002 | Jin et al. ...................... 359/224 |

FOREIGN PATENT DOCUMENTS

| | | |
|---|---|---|
| WO | WO 99/66354 | 6/1999 |
| WO | WO 99/67666 | 6/1999 |

OTHER PUBLICATIONS

Lin, Lih Y., Goldstein, Evan; "Oprical–Layer Networking: Opportunities For And Progress In Lightwave Micromachines," Office 2000 Tutorials, Mar. 10, 2000, pp. 168–169.

* cited by examiner

*Primary Examiner*—Evelyn A. Lester
(74) *Attorney, Agent, or Firm*—LaRiviere, Grubman & Payne, LLP

(57) ABSTRACT

An optical cross-connect switch employing pallets of mirror assemblies configured as an array, wherein each mirror assembly includes a mirror that is rotatable in a two-axis system to steer a beam in 2-dimensional space. Each mirror assembly includes a mirror module that can be rotated in relation to a first axis as well as in relation to a second axis that is perpendicular to the first axis. The mirror modules are suspended by wires in a manner that allows the pitch and roll of the mirror module to be controlled. Coils and magnets are employed to generate magnetic fields which create a rotating torque in each of the two rotational axes. By controlling the magnetic fields that are generated, the degree of rotation can in turn be controlled. The configuration provides for a practical, area efficient, bidirectional, randomly addressable optical cross-connect switch design that can employ conventional materials and processes.

15 Claims, 38 Drawing Sheets

US 6,775,043 B1

REFLECTOR ASSEMBLIES FOR OPTICAL CROSS-CONNECT SWITCHES AND SWITCHES FABRICATED THEREFROM

CROSS-REFERENCE TO RELATED APPLICATIONS

This application is a continuation-in-part of application Ser. No. 09/643,198 filed on Aug. 21, 2000, now abandoned. This application also related to application Ser. No. 09/812,230 filed on Mar. 16, 2001, now abandoned.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates generally to optical switches and, more particularly, to reflector assemblies and cross-connect switches using such reflector assemblies for direct switching of optical signals between input and output optical fibers.

2. Description of the Background Art

Because of its advantages over conventional electrical transmission mediums, including such advantages as increased bandwidth and improved signal quality, the use of fiber optics in communications networks has become commonplace. However, as with electrical signals transmitted over wires which need to be switched between various wires in order for the signals to reach their intended destinations, optical signals similarly need to be switched between different optical fibers at appropriate junctions so that the optical signals reach their intended destinations.

One method of switching an optical signal between fibers is to convert the optical signal to an electrical signal, employ conventional electronic switching components to switch the electrical signal, and then re-convert the electrical signal to an optical signal. An alternative approach is to employ direct optical switching, wherein the optical signal is directed between fibers. The latter approach has distinct theoretical advantages, including an increase in switching speed and a reduction in signal degradation, because it does note require optical-to-electrical and electrical-to-optical conversions.

When implementing direct optical switching, it is desirable to have the capability to switch an optical signal from any one of a number of optical fibers entering a junction (input fibers) to any one of a number of optical fibers exiting a junction (output fibers). Several ways of achieving this have been previously developed. For example, the use of fixed reflectors in conjunction with bending the fiber ends is a known technique. The fiber ends are not bent to point at one another, but rather are directed at one or more reflectors so that an optical signal from the input fiber is reflected to the output fiber. Another approach is to use moveable reflectors, as described in PCT International Publications Nos. WO 99/66354 "Planar Array Optical Switch and Method" and WO 99/67666 "Mirror Based Fiber Optic Switch and Control System", both of which are incorporated by reference herein. As can be expected, it is critical that the optical signal be directed from the input fiber such that it enters the output fiber along an optical pathway that is in substantial alignment with the output fiber. PCT International Publication No. WO 99/66354 describes various approaches to ensuring that the optical signals are properly aligned.

The problem with conventional state of the art optical switches that use moveable reflectors, however, is not the manner in which the reflectors are aligned with the input and output fibers. Techniques for controlling the position of and aligning reflectors in relation to input and output fibers in an optical switch array is well known. The most significant problem with current optical switches is that they rely heavily on microelectromechanical systems (MEMS) technology. Unfortunately, MEMS technology is not yet mature and is quite limited in its capabilities. One-axis mirrors relying on MEMS technology typically employ mechanical hinges which are susceptible to friction and wear. Therefore, such switches in general do not have an indefinite service life. Two-axis mirrors relying on MEMS technology tend to suffer from additional problems arising out of the common use of electrostatic drivers to position the MEMS mirrors. Electrostatic drivers, however, have a very limited linear response range (e.g., tens of microns) which limits the overall size of the mirror and, therefore, the beam size. The smaller the beam size, the shorter a beam can stay collimated after it passes through a collimating lens. This severely limits the path length and, therefore, the total number of fibers (and switching mirrors) that can be employed in an optical cross-connect (OXC) switch. In addition, the associated limited angular range of electrostatic drivers further limits the numbers of mirrors that can be placed in a MEMS optical cross-connect switch.

Because it is desirable to optically couple any input fiber to any output fiber in a cross-connect switch, moveable reflectors that can be positioned over a wide angular range are a necessity. There is also a need to be able to switch large numbers of signals in a limited space and, therefore, a concomitant need for an optical cross-connect switch design that is compact. Accordingly, there is a need for a reflector array design for an optical cross-connect switch which is suitable for mass production of switches, which provides for individually controllable reflectors over a wide angular range, and which does not solely rely on unreliable MEMS technology. The present invention satisfies those needs, as well as others and overcomes the deficiencies in current optical cross connect switching technologies.

BRIEF SUMMARY OF THE INVENTION

The present invention generally comprises reflector assemblies for use in optical cross-connect switches, as well as practical, area efficient, bi-directional, randomly addressable optical cross-connect switches fabricated using such reflector assemblies. More particularly, the invention comprises optical cross-connect switches that employ reflector assemblies with non-MEMS mirrors that can be fabricated using conventional materials and processes. The reflector assemblies are suitable for mass production of reflector assembly arrays (e.g., pallets) for use in optical cross-connect switches that can (i) achieve good telecom reliability and (ii) offer forward extendibility to larger numbers of switchable fibers.

By way of example, and not of limitation, a cross-connect switch fabricated according to the present invention comprises at least two reflector pallets, wherein each reflector pallet comprises a plurality of reflector assemblies configured in an array. Each reflector assembly includes a non-MEMS mirror that can be rotated in relation to a first axis as well as in relation to a second axis that is generally perpendicular to the first axis, and associated means for rotating the mirror. This two-axis system permits a beam to be steered in two-dimensional space, thus allowing any input fiber to be switched to any output fiber. Therefore, to form a cross-connect switch in accordance with the present invention, an array of input optic fibers is positioned in relation to at least a first reflector pallet, and an array of output optic fibers is positioned in relation to at least a second mirror pallet, wherein each reflector assembly is associated with a single optic fiber. As a result of this configuration, the switch is easily scalable for any number of fibers. Furthermore, the reflector assemblies provide for fabrication of a high fiber packing density, small mirror, small coil, low inductance, fast switching and reliable optical cross-connect switch system for mass production.

In an embodiment of a cross-connect switch in accordance with the present invention, reflector pallets are placed on the opposite sides of the fibers, with one pallet directly in the path of the input fibers at preferably an approximately forty-five degree angle in relation to the axis of the input fibers, and the other pallet directly in the path of the output fibers also at preferably an approximately forty-five degree angle in relation to the axis of the output fibers. The distance between the centers of the input/output fiber bundles is approximately the same as that between the centers of the two reflector pallets. In this embodiment, the reflector pallets form a generally planar switch configuration.

In an alternative embodiment of a cross-connect switch in accordance with the preset invention, a plurality of reflector pallets are assembled into an array of pallets or "super-pallet". Each reflector pallet, which serves as an element of the "super-pallet", is arranged with a relative angle of tilt with respect to each other such that the super-pallet is cupped or dome-shaped. As a result, the angular range of operation of each mirror in a mirror module is more balanced about a neutral point. All pallet base planes rest on the "roof top" of the cross-connect switch, with different planes for each pallet, and associated relative angles between planes. The input and output fibers have corresponding fiber to fiber pitches to match the mirror to mirror pitches, whether on the same or different pallet, to form substantially close to a forty-five degree incident or exit angle on the mirrors.

In an embodiment of a reflector assembly in accordance with the present invention, a mirror module and associated mirror are suspended by a support frame which is in turn suspended by a support base. The components are suspended by flexible wires in a manner that allows the pitch and roll of the mirror module to be controlled. The mirror module includes a coil, as does the support frame. A first pair of opposing electromagnetic control assemblies, each comprising a magnet and a yoke, are positioned in relation to the mirror module, and a second pair of such electromagnetic control assemblies are positioned in relation to the support frame. By selectively energizing the coils, controllable magnetic fields can be generated which create a rotating torque in each of the two rotational axes. By controlling the magnetic fields that are generated, the degree of rotation can in turn be controlled.

In another embodiment of a reflector assembly in accordance with the present invention, the mirror modules employ a unitary mirror mount and support frame (e.g., bobbin) that is suspended by flexible wires from a corresponding support base and which rotates around two axes in relation to the support base. In this embodiment, four coils are attached directly to the mirror mount/support frame to increase structural stiffness and reduce crosstalk between the two rotational axes. In addition, four corresponding magnet assemblies are attached directly to the support base and positioned in relation to the coils. As in the first embodiment, by controlling the magnetic fields that are generated, the degree of rotation can in turn be controlled.

In a still further embodiment of a reflector assembly in accordance with the present invention, the mirror modules are suspended by "serpentine" like springs, wherein one end of each spring is attached to or fabricated directly onto a mirror frame and the other end is attached to a mirror or mirror mount. The mirror frame is in turn attached to a support frame. Each mirror or mirror mount is coupled to a plurality of coils of curved or straight shapes via a central stem of hemispherical-shaped flexible material attached to the mirror or mirror mount. In this embodiment, magnets and yokes essentially form a circular magnetic field for the coils. The coils are placed along the circumference of a circle within the mirror, such that when energized by current, a force results along a tangent to the circle.

In another embodiment of a reflector assembly in accordance with the present invention, the driving magnets form all or part of the support frame, and are shaped such that the magnetic pole surfaces become part of a hemisphere around the coils that also substantially form a hemisphere, whether the coils are curved or straight. In this embodiment, only one side of the coil faces the magnet in close proximity, resulting in a lower efficiency than the third embodiment, but with less complexity.

Further embodiments of a reflector assembly and variations of the foregoing embodiments are also included as aspects of the invention.

Beam position sensors, such as photodiodes, can be included on the mirror surface or adjacent to the mirror surface to control the centering of the beam on the mirror surface. Additionally, rotation sensors can be mounted on rotatable portions of the assembly to monitor and control the roll and pitch of the mirror. The rotation sensors could be Hall effect, capacitive, position error sensors (PES) or the like. Alternatively, the rotation sensors could be strain gauges or the like that are mounted on the suspension wires.

An object of the invention is to provide a reflector assembly for an optical cross-connect switch that does not employ MEMS technology.

Another object of the invention is to provide a reflector assembly for an optical cross-connection switch that does not employ electrostatic drivers.

Another object of the invention is to provide a reflector assembly for an optical cross-connect switch that can be fabricated from materials other than silicon.

Another object of the invention is to provide a reflector assembly for an optical cross-connect switch that uses an electromagnetic driving mechanism that includes coils and magnets.

Another object of the invention is to provide a reflector assembly for an optical cross-connect switch that has a larger range of two-dimensional angular motion than in a conventional MEMS switch.

Another object of the invention is to provide a reflector assembly for an optical cross-connect switch that is more reliable than in a conventional MEMS switch.

Another object of the invention is to provide a reflector assembly for an optical cross-connect switch that can be fabricated in the centimeter to sub-centimeter size range.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only and where like reference numbers denote like elements.

DETAILED DESCRIPTION OF THE INVENTION

Figure 1:
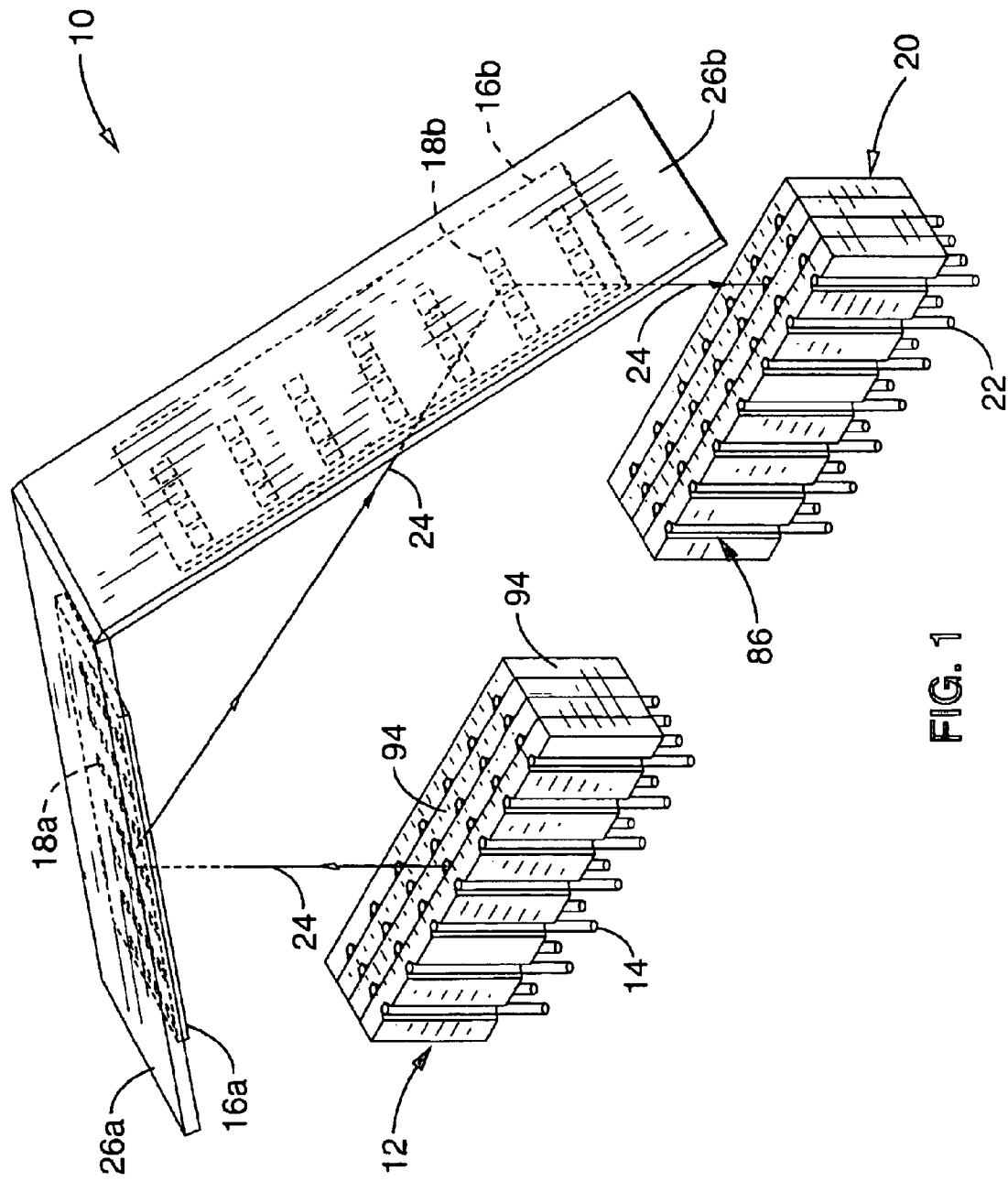
FIG. 1 is a perspective schematic view of an optical cross-connect switch according to the present invention positioned in relation to an input fiber bundle and an output fiber bundle.
Figure 57:
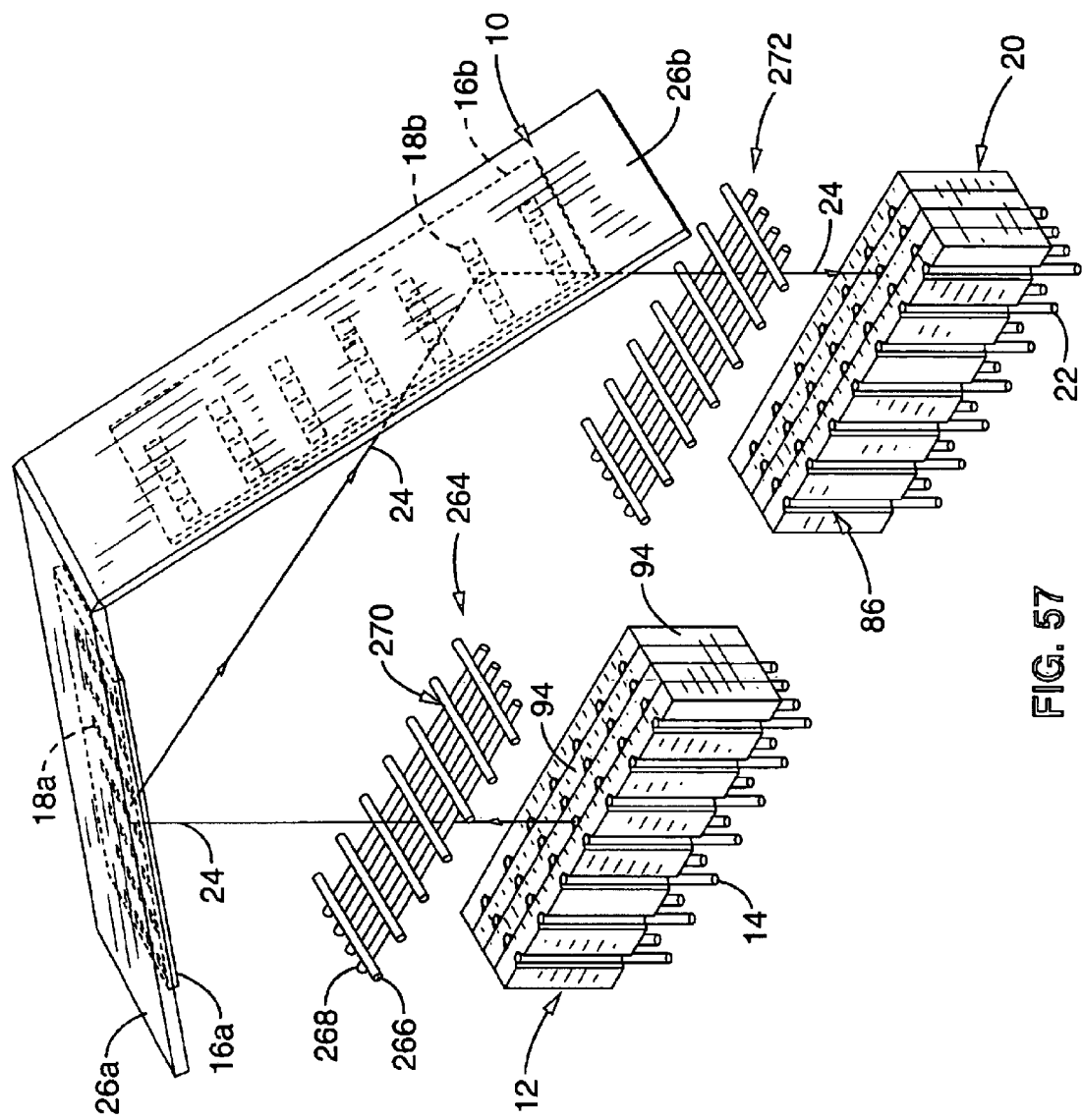
FIG. 57 is a perspective schematic view of an alternative embodiment of the optical cross-connect switch shown in FIG. 1, in which a crossed microlens array is used for collimation of the light beams.

Referring more specifically to the drawings, for illustrative purposes the present invention is embodied in the apparatus generally shown in FIG. 1 through FIG. 57. It will be appreciated that the apparatus may vary as to configuration and as to details of the parts, and that the method may vary as to the specific steps and sequence, without departing from the basic concepts as disclosed herein.

Referring first to FIG. 1, an optical cross-connect switch 10 according to the present invention is shown. In general terms, switch 10 comprises an input optic fiber bundle 12 for positioning a plurality of input optic fibers 14 in relation to a first reflector pallet 16a with an array of individual reflector assemblies 18a, a second reflector pallet 16b having an array of individual reflector assemblies 18b, and an output optic fiber bundle 20 for positioning a plurality of output optic fibers 22 in relation to second reflector pallet 16b.

As can be seen, the input and output optic fiber bundles are on the same side of the optical switch. Either end of the switch can be used as an input or output. The two reflector pallets are placed on the opposite sides of the fibers, with one pallet directly in the path of the input fibers at preferably an approximately forty-five degree angle in relation to the axis of the input fibers, and the other pallet directly in the path of the output fibers also at preferably an approximately forty-five degree angle in relation to the axis of the output fibers. The distance between the centers of the input/output fiber bundles is approximately the same as that between the centers of the two reflector pallets.

Reflector pallets 16a, 16b may be supported in a variety of ways, in the schematic of FIG. 1 they are shown supported by circuit boards 26a, 26b, respectively, which would also provide the connections to control circuitry. Details of the control circuitry are not shown and do not form a part of the invention herein.

As can be seen, a beam 24 originating from a selected input optic fiber 14 in input optic fiber bundle 12 and directed to reflector pallet 16a will be redirected to second reflector pallet 16b and onto a selected output optic fiber 22 in output optic fiber bundle 20. Using this cross-connect switch, any input optic fiber can be optically coupled to any output optic fiber.

While the number of fibers and number of reflectors do not need to be the same, it is desirable for an optical cross-connect switch to have an approximately equal number of fibers and reflectors for maximizing switching capabilities and using space efficiently. Therefore, in the preferred embodiment, the number of reflectors in an array approximately equals the number of input fibers, which is the same as the number of output fibers. This forms a bidirectional, randomly addressable, optical cross-connect switch of size N×N, with N being the number of reflectors in an array, and also preferably the number of fibers in the input and output fiber bundles.

Figure 2:
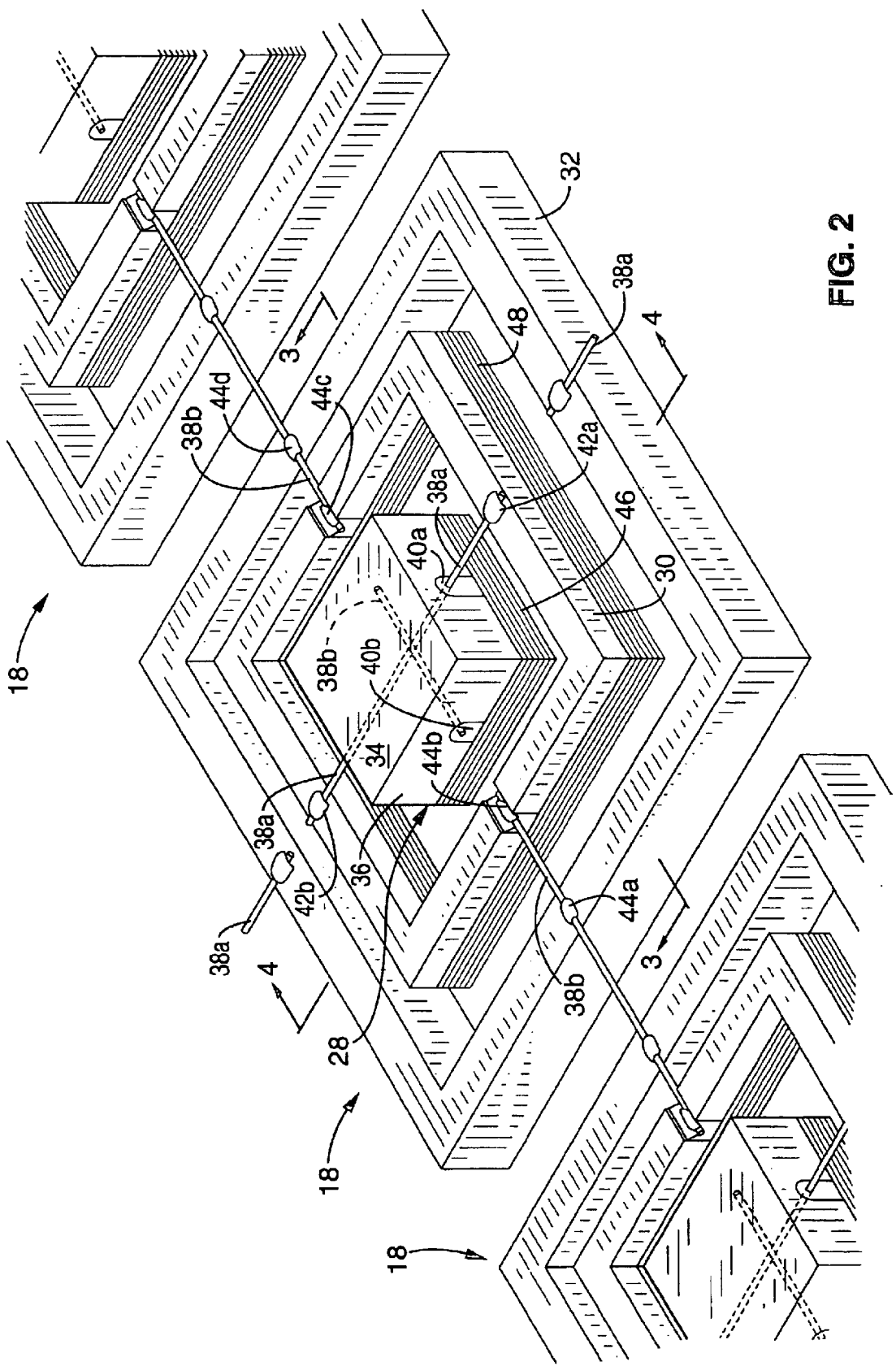
FIG. 2 is a perspective view of a reflector assembly according to an embodiment of the invention.

Referring also to FIG. 2, an example of a first embodiment of a reflector assembly 18 is shown. In this embodiment, the assembly comprises a mirror module 28, a support frame 30, and a support base 32. Preferably, mirror module 28 comprises a reflective surface 34 located on the upper surface of a substrate base 36, the combination of which forms a mirror for reflecting a beam of light. Reflective surface 34 preferably has high reflectivity, such as on the order of approximately 0.9 and above, is non-silicon, and preferably comprises a metal, such as gold, optimized for minimum energy absorption for a specific range of wavelengths. Substrate base 36 provides support and backing for the mirror surface, and can be made from glass, ceramics and other materials that have high strength, good thermal conductivity and is compatible with conventional wafer processing techniques such as deposition, etching and polishing. The preferred material is glass, but ceramic materials could be used if highly polished to a thirty Angstrom or better surface roughness. In this regard, note that an important aspect of the invention is that mirror module 28 is not fabricated primarily from single crystal silicon; it is substantially non-silicon. Further note that reflective surface 34 is non-silicon; it is metal. Therefore, the present invention provides for a wider choice of materials than used in MEMS technology, as well as better performance and reliability than with MEMS technology.

Figure 3:
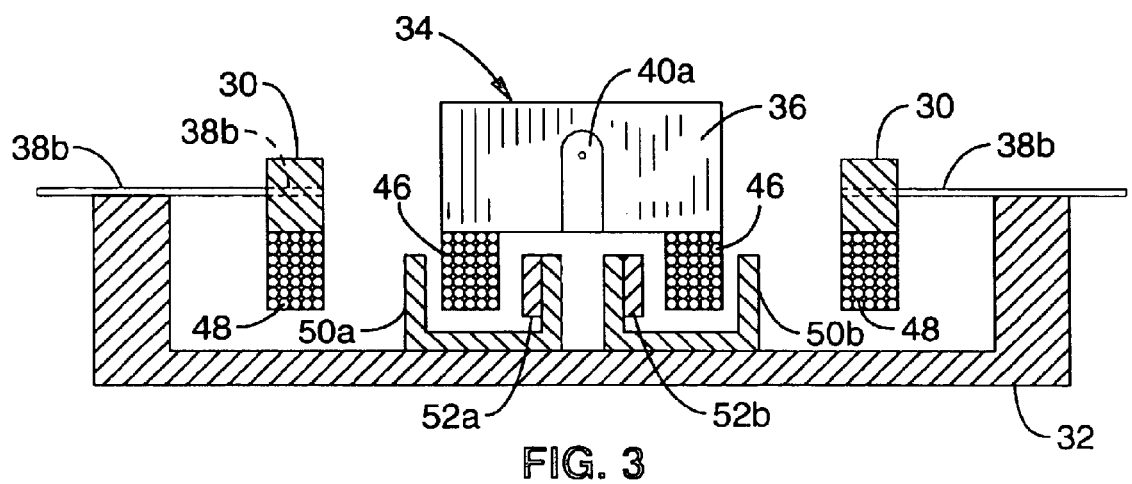
FIG. 3 is a cross-sectional view of the reflector assembly of FIG. 2 taken through line 3—3.
Figure 4:
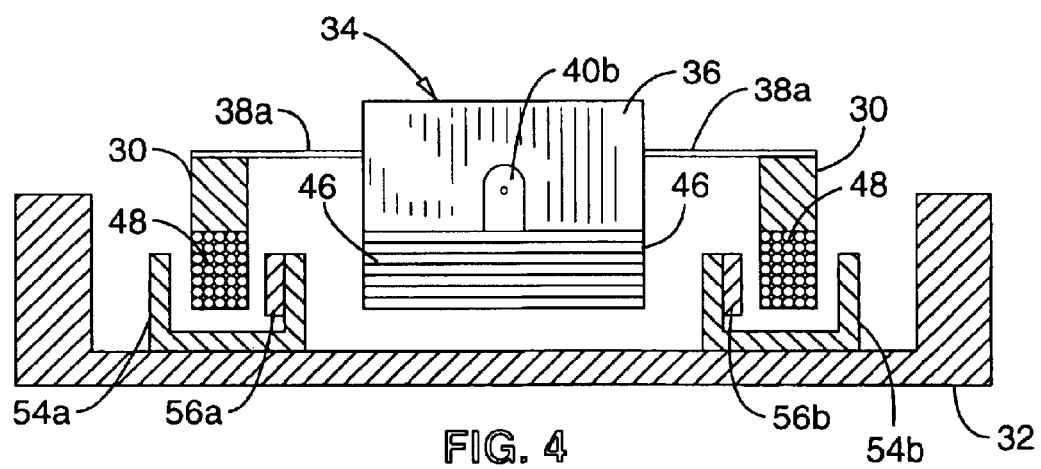
FIG. 4 is a cross-sectional view of the reflector assembly of FIG. 2 taken through line 4—4.

Referring to FIG. 2 through FIG. 4, together, a flexible suspension system is also provided to allow mirror module 28 to rotate in two axes (pitch and roll) for steering beams 24. In the embodiment shown, the suspension system comprises a pair of flexible wires 38a, 38b that extend through substantially perpendicular channels 40a, 40b, respectively, in substrate base 36. Wires 38a, 38b can have various cross-sectional shapes, but are preferably round, square or rectangular in cross-section, and can be made of metal or other flexible materials that function as torsional bars. Note that, unlike the hinges in MEMS switches, the suspension system of the present invention is not fabricated primarily from silicon. To the contrary, it is substantially non-silicon. Also, while wires 38a, 38b are shown extending through substrate base 36 and aligned perpendicular in relation to each other, they may alternatively be positioned parallel to, or at an angle to, mirror module 28 depending on packaging or other considerations.

As indicated above, the suspension system allows mirror module 28 to rotate in two axes. One rotational axis is the axis through which wire 38*a* extends, while the other is the axis through which wire 38*b* extends. As can be seen, wire 38*a* is soldered or otherwise attached to support frame 30 at points of attachment which, in FIG. 2, are shown as points 42*a*, 42*b*. In this way, wire 38*a* not only suspends mirror module 28 in relation to support frame 30, but provides a first rotational axis for mirror module 28. As can also be seen, wire 38*b* spans support frame 30 and support base 32, and is soldered or otherwise attached to each at points of attachment which, in FIG. 2, are shown as points 44*a*, 44*b*, 44*c* and 44*d*. This configuration suspends support frame 30, as well as mirror module 28, in relation to support base 32, and also provides a second rotational axis for mirror module 28.

Note that wire 38*b* in FIG. 2 is shown as being discontinuous. The reason is that, for ease of fabrication, wire 38*b* is first extended through channel 40*b* and across support frame 30 and support base 32, and then attached to support frame 30 and support base 32. Thereafter, wire 38*b* is cut and partially removed to create the space between support frame 30 and mirror module 28 and establish rotational freedom about the axis through which wire 38*a* extends. The remaining portion of wire 38*b* can be either left in mirror module 28 as shown or removed if desired. Note also that wire 38*b* is shown as extending on each side of support base 32 for attachment of additional reflector assemblies 18. In FIG. 2, two such additional reflector assemblies 18 are shown. To create a pallet 16, wire 38*a* would be similarly extended for support base to support base connection of additional mirror assemblies in the array, being cut to leave spaces between support frame 30 and support base 32 as shown.

It will be appreciated that mass production of an array is facilitated by using long wires 38*a*, 38*b* to allow a large number of mirror assemblies to be supported during fabrication. Furthermore, where all the wire suspensions terminate at intermediate points (as shown in FIG. 2 where the wires are bonded to support frame 30 or base 32), structural stiffness is very high, thereby reducing crosstalk between the two rotating axes. However, while the foregoing configuration is preferred, alternative suspension systems could be used as well. For example, the suspension system could be made from a universal joint with one end supporting the mirror, and the other end connected to a base support.

Figure 5:
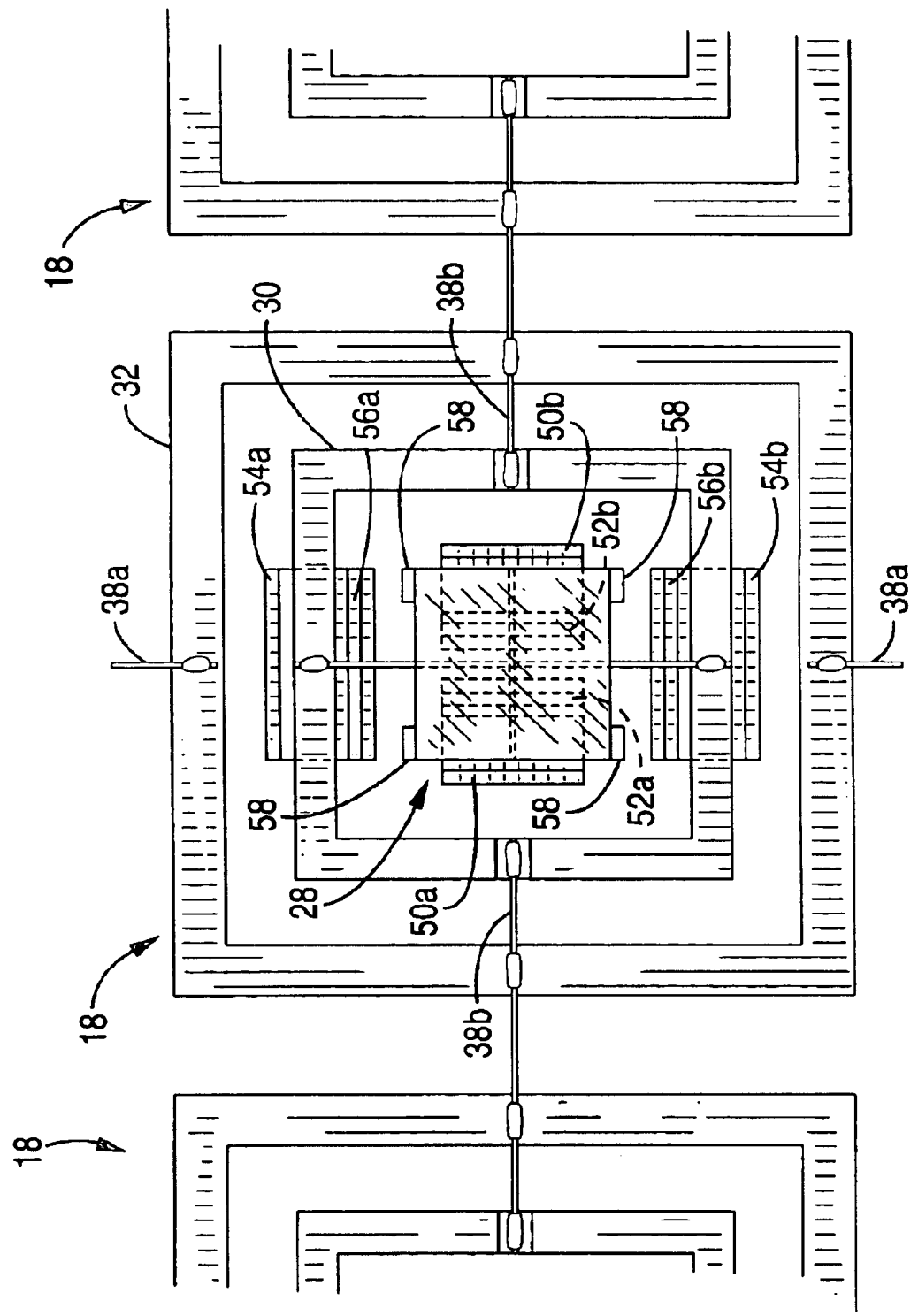
FIG. 5 is a plan view of the reflector assembly of FIG. 2.

As can be seen, therefore, the assembly comprises a rotatable two axis system to steer a beam in two-dimensional space. In order to cause movement of mirror module 28 in relation to support frame 30 around a first axis, or to cause movement of support frame 30 (as well as mirror module 28) in relation to support base 32 around a second axis perpendicular to the first, conventional electromagnetic technology using coils and magnets is preferably employed. In the embodiment shown in FIG. 2, note that a first coil 46 is positioned beneath substrate 36 and around its periphery, and a second coil 48 is positioned beneath support frame 30 and around its periphery. The magnets, which are not shown in FIG. 2 for clarity, can be seen in the partial cross-sectional views of FIG. 3 and FIG. 4 as well as the plan view of FIG. 5. As shown in FIG. 3 and FIG. 5, opposing U-shaped return plates 50*a*, 50*b* are attached to support base 32 and positioned around coil 46, and hold magnets 52*a*, 52*b*, respectively. Similarly, as shown in FIG. 4 and FIG. 5, opposing U-shaped return plates 54*a*, 54*b* are positioned around coil 48 and hold magnets 56*a*, 56*b*, respectively. Return plates 50, 54 are preferably fabricated from materials containing iron (e.g., ferromagnetic materials), and provide a closed return path for magnetic flux. By energizing coils 46, 48 as desired, the roll and pitch of mirror module 28 can be controlled as a result of generating a rotating torque in each of the two rotation axes.

Those skilled in the art will appreciate that, while the electrical connections to the coils and sensors are not shown, the electrical connections to coils 46, 48 can be made by using loose wires that are sufficiently flexible and routed in such a way so as not to interfere with the rotation of mirror module 28 or support frame 30. Each mirror assembly functions in a similar manner to an electromagnetic actuator in a commercial data storage device such as a hard disk or optical drive, and the wires can be connected in a similar manner.

An alternative connection method, however, is to take advantage of wires 38*a*, 38*b* in a way that avoids the need to use separate electrical wires that could possibly interfere with rotation. This can be accomplished by depositing an insulating material such as SiN over wires 38*a*, 38*b*, as well as over selected portions of support base 32, support frame 30, and mirror module 28. A conductive trace, such as copper, aluminum, silver, gold or the like, can then be deposited over the insulating material to form a conductor that can connect to the coils at one end and to separate electrical wires at the other end. For example, to form an electrical conductor to connection to coil 48, an insulating layer could be deposited over wire 38*b* starting at a suitable connection point between adjacent support bases, continuing around solder connection 44*a* and over the upper surface of support base 32, continuing along wire 38*b* to support frame 30, and then down the side surface of support frame 30 to coil 48. A conductive trace for the electrical connection to coil 46 would then be deposited over the insulating layer. To form an electrical connection to coil 46, the insulating layer would be continued along the upper surface of support frame 30, onto wire 38*a*, along wire 38*a* to mirror module 28, and down the side surface of mirror module 28 to coil 46. A second conductive trace, spaced apart from the first conductive trace, would then be deposited over the insulating layer between coil 46 and a suitable connection point between the support bases.

Figure 6:
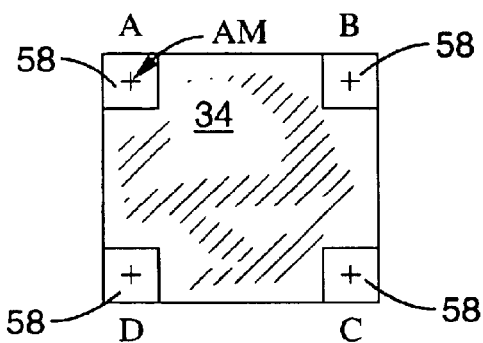
FIG. 6 is a plan view of the reflector surface of the reflector assembly of FIG. 2.

Referring also to FIG. 6, beam position sensors 58, such as photodiodes, can be directly fabricated onto mirror surface 34, or attached by soldering, laser welding or the like to mirror surface 34, to control the centering of the beam to the mirror surface. In the case of attachment, the photodiodes should preferably have a low profile so that they do not interfere with the beam. Alternatively beam position sensors 58 can be mounted on the sides of substrate base 36 close to the reflective surface as shown in FIG. 5. Using the designations A, B. C and D in FIG. 6 to indicate the outputs of the beam position sensors, a beam will be centered on mirror surface 34 when (A+D)−(B+C)=0 and (A+B)−(C+D)=0. Electrical connections to these sensors can be made through loose separate wires or by depositing conductive traces on wires 38*a*, 38*b* as described above. Furthermore, alignment marks, which are indicated by the designation "AM" in the drawings, may be positioned on reflective surface 34 if desired.

Figure 7:
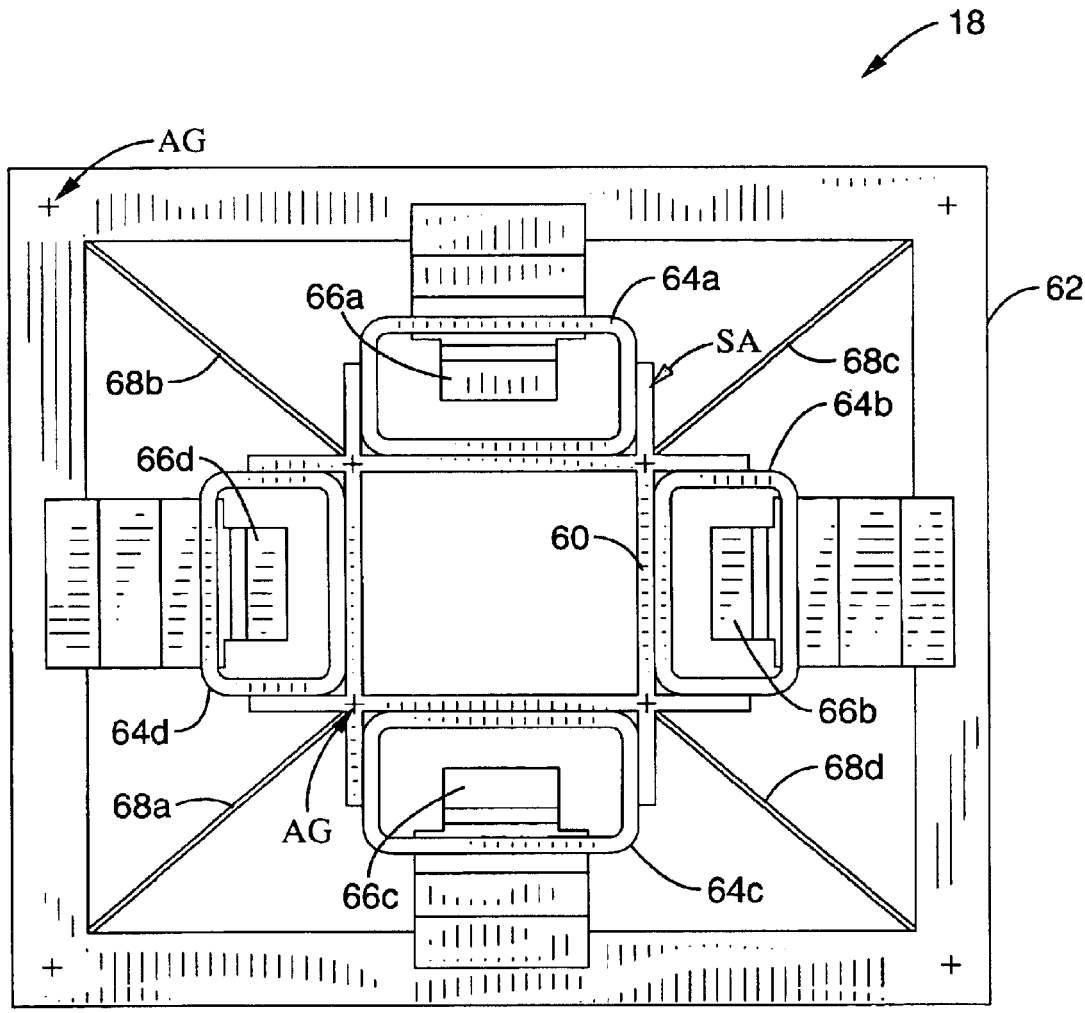
FIG. 7 is a plan view of a reflector assembly according to a second embodiment of the invention which employs a unitary mirror mount and support frame.
Figure 8:
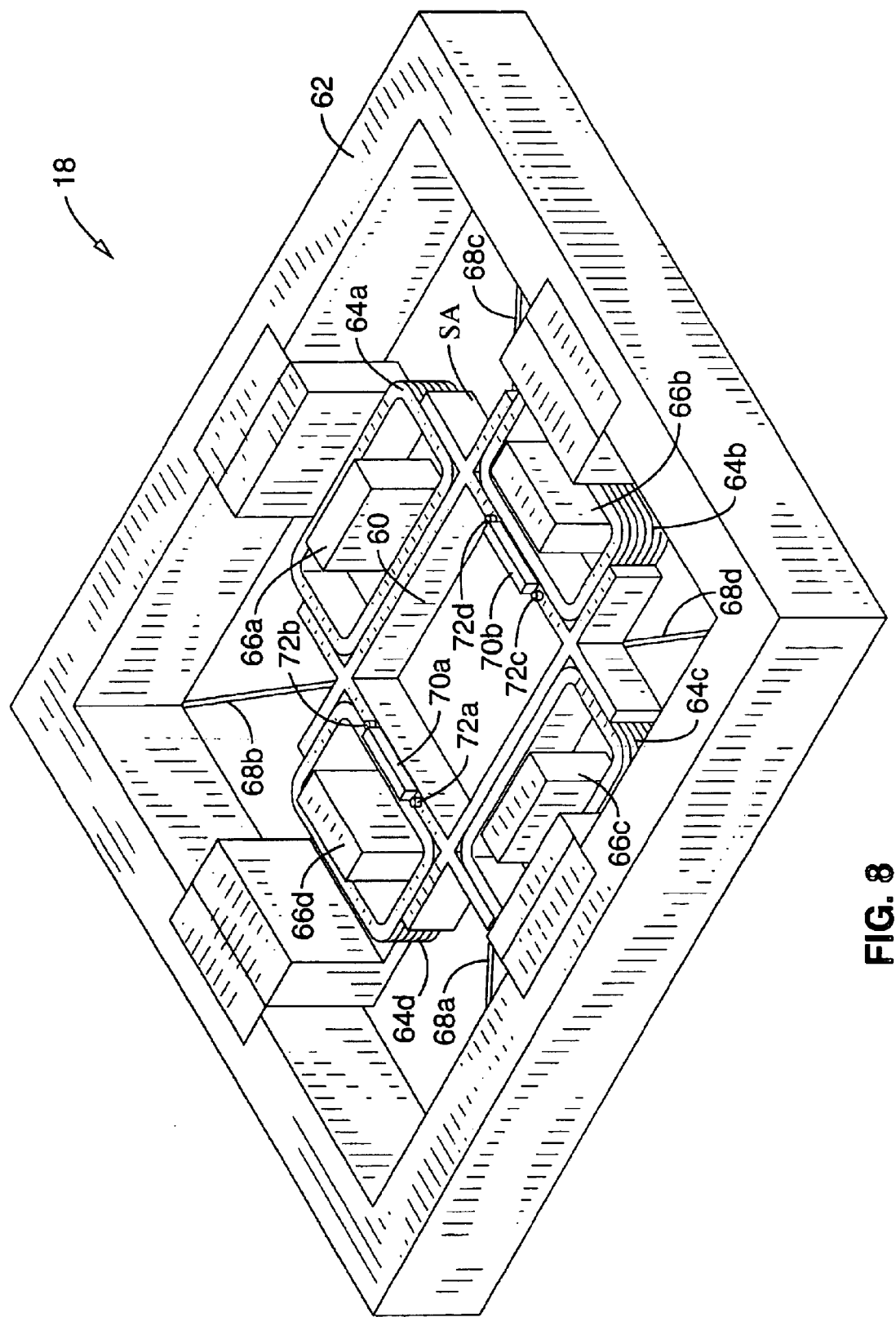
FIG. 8 is a perspective view of the reflector assembly of FIG. 7.
Figure 9:
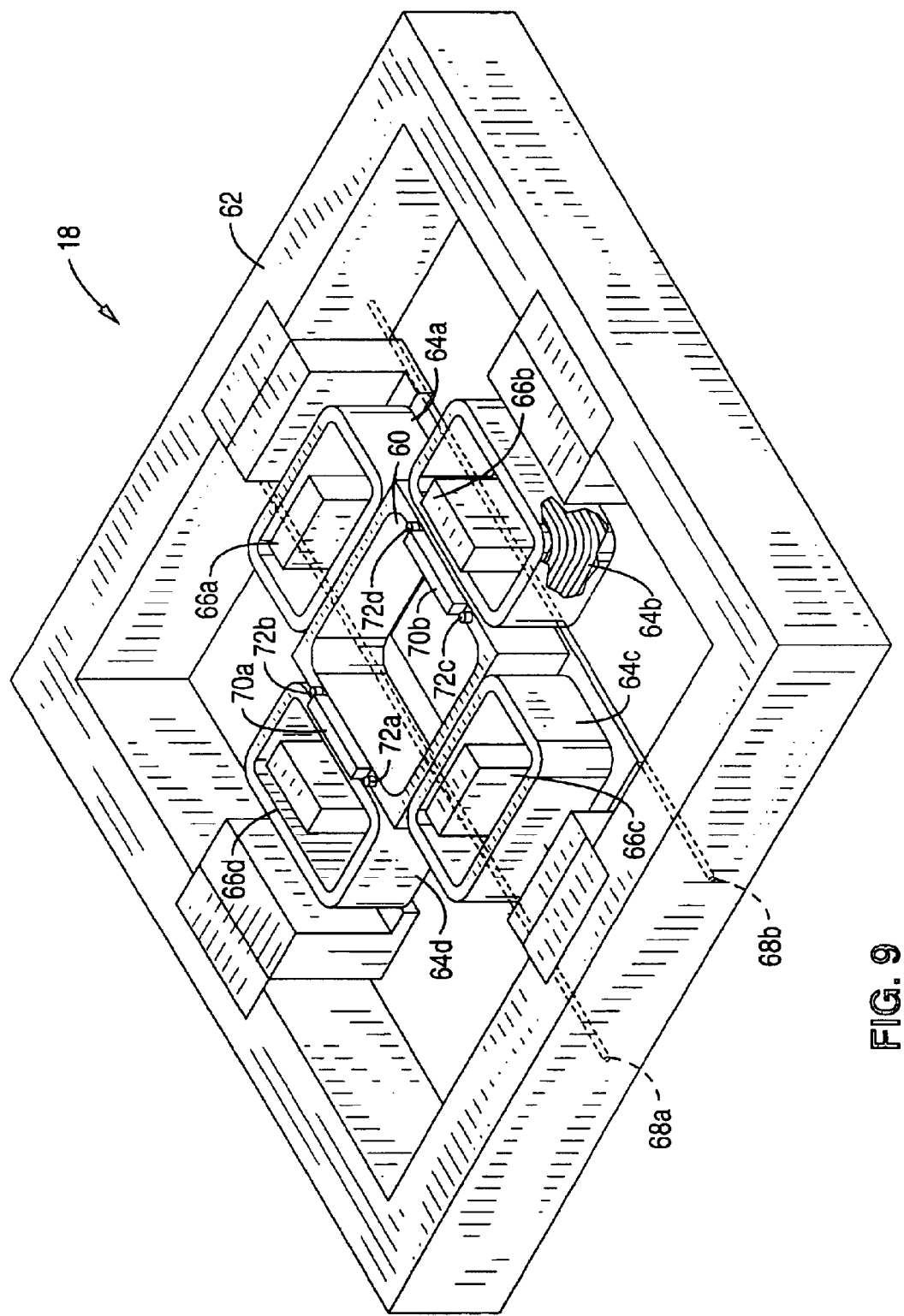
FIG. 9 is a perspective view of a reflector assembly according to a third embodiment of the invention which employs an alternative embodiment of the unitary mirror mount and support frame shown in FIG. 7 and FIG. 8.

Referring now to FIG. 7 and FIG. 8 together, as well as to FIG. 9, two alternative embodiments of reflector assembly 18 are shown that employ a unitary mirror mount and support frame, namely bobbin 60, that rotates around two axes in relation to a corresponding support base 62. In this embodiment, four coils 64*a*, 64*b*, 64*c* and 64d are attached directly to bobbin 60 to increase structural stiffness and reduce crosstalk between the two rotational axes. As can be seen, therefore, in these embodiments of the invention all of the coils and the mirror rotate as a single unit. In FIG. 7 and FIG. 8, coils 64a, 64b, 64c and 64d are shown as nonencapsulated coils that are glued or otherwise attached to mirror mount 60 and support arms SA on bobbin 60. In FIG. 9, support arms SA are not present on bobbin 60 and coils 64a, 64b, 64c and 64d are encapsulated in a resin, polymer or like material. The encapsulated coils are then glued or otherwise attached to bobbin 60.

Four U-shaped magnets 66a, 66b, 66c and 66d are attached directly to support base 62 and extend around corresponding coils. The coils and magnets could be pressed, plated or sputtered. A wafer processing approach, such as commonly used for fabricating coils and magnets for magnetic recording heads, enables the fabrication of small mirror modules with high fiber packing density.

Bobbin 60 and support base 62 can be made from conventional materials such as metal (e.g. aluminum, magnesium, beryllium-copper), plastics, and ceramics, which are machinable and/or moldable for high volume production and which are known to be reliable components in electromechanical and optical devices. Special features such as alignment grooves, which are indicated with the designation "AG" in the drawings, could be fabricated onto the mirror mount and/or frame to enable batch alignment of multiple units. Furthermore, rotation sensors can be mounted in the vicinity of the coils and mirror mount on the mirror module to monitor and control the roll and pitch. For example, the rotation sensors could be Hall effect, capacitive, position error sensors (PES). Alternatively, rotation sensors could be strain gauges mounted on the suspension flexures.

Figure 10:
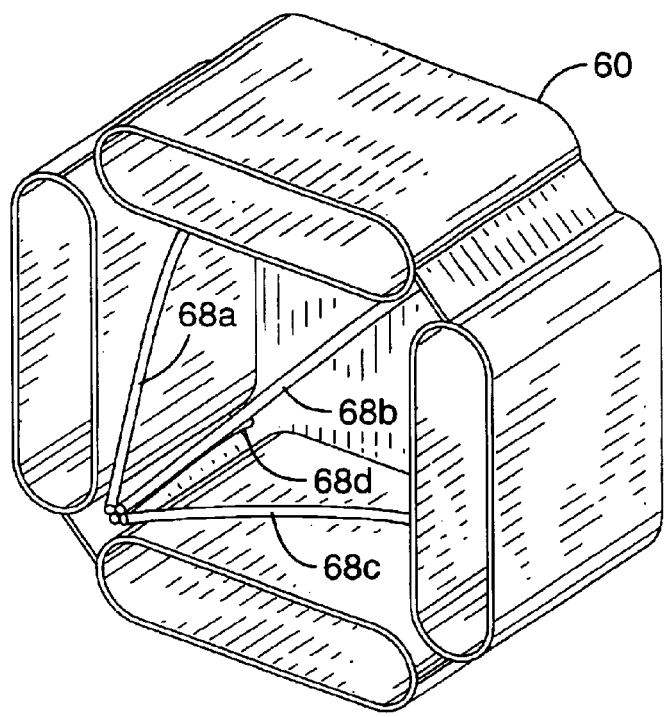
FIG. 10 is a perspective view of an embodiment of a unitary mirror mount and support frame that can be suspended above a support base.
Figure 11:
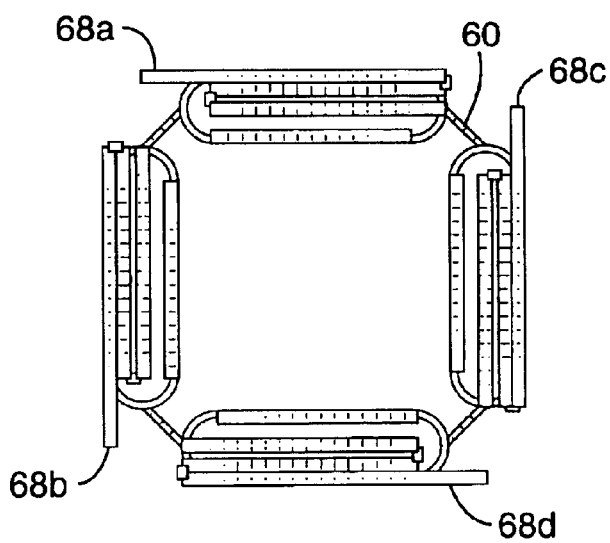
FIG. 11 is a top plan view of an embodiment of a unitary mirror mount and support frame that employs a compact spring suspension system.

Note the X-shaped configuration of suspension wires 68a, 68b, 68c and 68d in FIG. 7 and FIG. 8. The wires are soldered, glued or otherwise securely attached between bobbin 60 and support base 62 beneath mirror mount 60. While four separate wires can be used, for ease of fabrication and alignment it is preferable to use two wires that cross each other, attach the wires between bobbin 60 and support base 62, and then cut the wires in the area of receptacle 62. Alternatively, the wires can be left uncut, but cutting and removing a portion of the wires reduces weight. An alternative suspension configuration is shown in FIG. 9, where support wires 68a, 68b are parallel to each other. Other configurations could be employed as well, such as a "parachute" configuration as shown in FIG. 10 where the support wires converge at a point and support the assembly on a base at the point of convergence, and a "serpentine" configuration as shown in FIG. 11 where the support wires are folded back on themselves and function as springs, or other variations. This illustrates the degree of flexibility available for packaging or other fabrication considerations. In other words, any wire configuration can be used that provides support while at the same time is compact and still permits two degrees of rotational freedom. However, the configurations shown in FIG. 8 and FIG. 11 provide a high degree of stability and control, and the configuration shown in FIG. 11 is particularly compact. Note also, that FIG. 10 and FIG. 11 further illustrate that the shape of bobbin 60 can vary as well.

Figure 12:
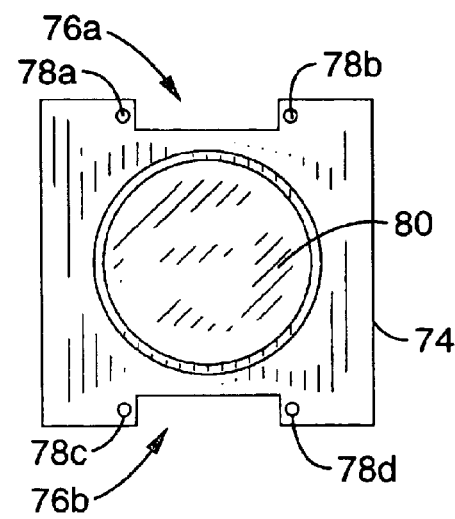
FIG. 12 is a plan view of a mirror for use with the mirror mounts shown in FIG. 7 through FIG. 11.

Referring again to FIG. 7 and FIG. 8, note that the mirror is not shown for clarity. The mirror, which would be fabricated from the materials and in the manner previously described, would be mounted in the central area of mirror mount 60. FIG. 12 shows an example of a mirror holder 74 that can be attached to bobbin 60. Bobbin 60 would preferably include tabs 70a, 70b and/or alignment pins 72a, 72b, 72c, 72d for attachment and alignment of mirror holder 74. Mirror holder 74 in turn has cutouts 76a, 76b for receiving tabs 70a, 70b, respectively, and holes 78a, 78b, 78c, 78d for receiving alignment pins 72a, 72b, 72c, 72d, respectively, on bobbin 60. Mirror holder 74 preferably carries a circular-shaped mirror 80 rather than a square-shaped or rectangular-shaped mirror as previously described. Alternatively, an elliptical-shaped mirror can be used. Because a round beam of light becomes elliptical by the time it impinges on a mirror whether the mirror is round, square or rectangular, the highest performance is achieved from a mirror that is round or square in shape.

Figure 13:
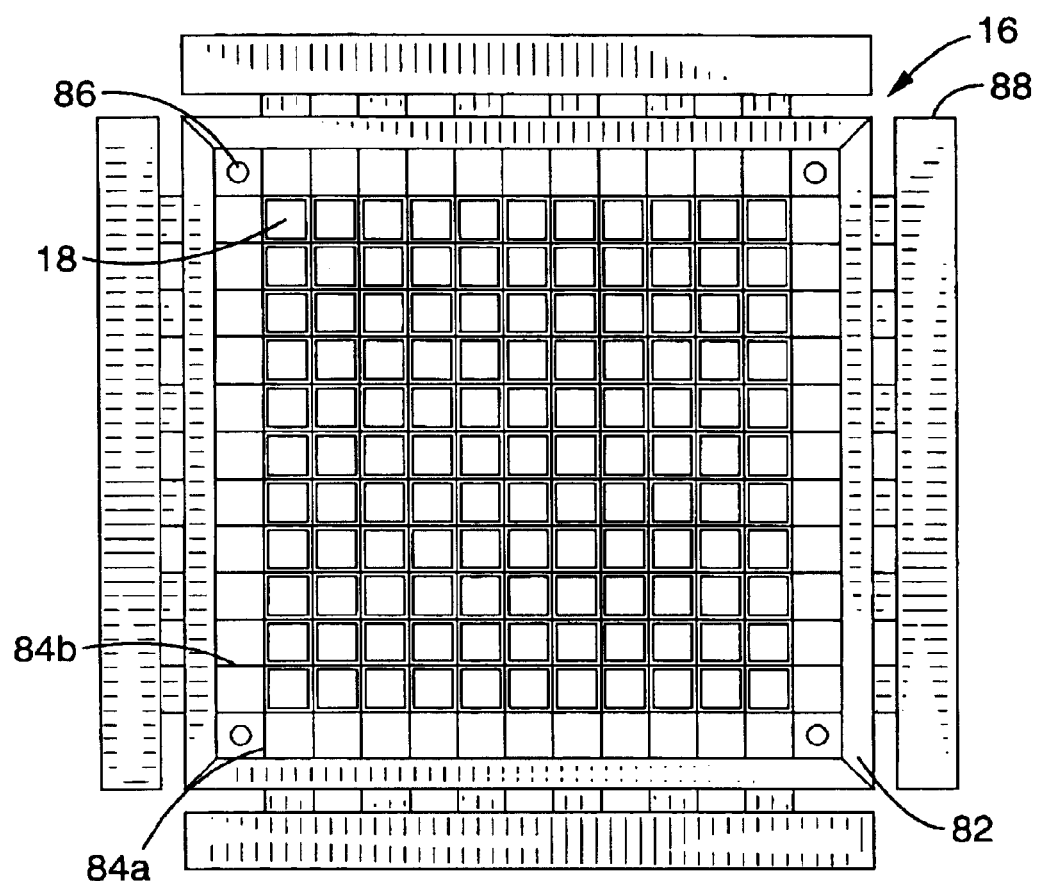
FIG. 13 is a plan view of a reflector pallet according to an embodiment of the invention.
Figure 14:
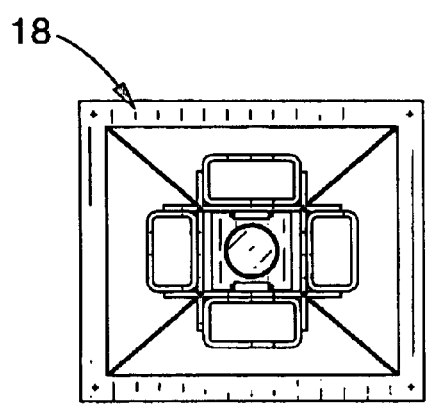
FIG. 14 is a detailed plan view of a unitary mirror mount and support frame in the pallet of FIG. 13 shown in relation to the wire support matrix.

Referring now to FIG. 13, each reflector assembly 18 (e.g., mirror, mirror mount, suspension system, coils, magnets and return plates, and related components as previously described) is preferably pre-fabricated and then placed adjacent to the other mirror assemblies in mirror pallet 16 to form an array of a plurality of rows and columns of mirror assemblies. The mirror pallet can comprise a frame 82 or the like that supports a matrix of wires 84a, 84b that in turn holds the mirror assemblies. Wires 84 can be made of various materials such as beryllium copper (BeCu) or the like. The mirror pallet is in turn attached to circuit board 28. Each pallet and/or circuit board would carry necessary associated circuitry and interfaces for use as an optical cross-connect switch.

In the case of the reflector assemblies 18 as shown in FIG. 2, support wires 38a, 38b form the wire matrix that is aligned and attached to frame 82. The pallet assembly would then be attached to a circuit board 28. In the case of the reflector assemblies 18 shown in FIG. 7 through FIG. 9, a wire matrix comprising a first plurality of parallel wires 68a that cross a second plurality of parallel wires 68b could be used. The individual reflector assemblies 18 would be placed into the wire matrix by soldering, gluing or otherwise attaching their support bases 62 to wires 68. The wire support matrix would then be soldered, glued or otherwise affixed to frame 82 after alignment. The pallet would then be attached to circuit board 28. Alternatively, support bases 62 could be aligned and attached directly to circuit board 28. Furthermore, suspension wires 68a, 68b, 68c and 68d used with the individual reflector assemblies 18 shown in FIG. 7 through FIG. 9 could alternatively be long wires running between mirror assemblies, in which case the suspension wires themselves would form the wire matrix for the pallet. In that case, the individual mirror assemblies would be aligned in relation to each other during attachment of the suspension wires to bobbins 60 and support bases 62, thus eliminating the need to attach individual mirror assemblies to a separate wire matrix.

Note that, in all configurations thus described, any non-functional suspension wire segments can be removed during fabrication of the mirror assemblies as described previously or, alternatively, the suspension wires can be left intact until the matrix is aligned and attached. At that point, any non-functional parts can be cut by sharp blades or a laser, to free up the dynamically moving parts for operation.

As is also shown in FIG. 13, alignment sensors 86, such as photodiodes or the like, are mounted at selected sites (e.g. corners and mid-points) on the pallet such that once the pallet is aligned, the individual mirrors on the pallet are well aligned, reducing the need for additional alignment and compensation. Also, shown for context, a plurality of linear encoders 88 such as those commonly used in the test equipment industry, can be employed for aligning the entire array. Alignment sensors 86 are used as master alignment marks. The four encoders are used in conjunction with alignment sensors 86 to lay down the preassembled matrix of wires with preassembled mirror modules up to the point of soldering the wires. The matrix is then laid down to achieve correct coordinate positioning. In the case of the configuration shown in FIG. 2, the individual mirror modules are self-aligning in relation to each other due to the use of channels and grooves in combination with support wires 38a, 38b. Therefore, the suspension wires can be soldered to frame 82 at this point. In the case of the configurations shown in FIG. 7 through FIG. 9, the mirror modules are first aligned in relation to each other and then soldered to the wire matrix as described above prior to the wire matrix being aligned and soldered to frame 82 or, alternatively, the wire matrix formed by long suspension wires 68a, 68b, 68c and 68d running between adjacent mirror modules as described above would be aligned and soldered to frame 82. Due to alignment features in the mirror assemblies, and especially in the case were the wire suspensions used for actuation are also used to form the wire matrix, the mirror alignment process is much simplified. It will also be appreciated that rows or columns of mirror assemblies could be attached to a long wire will form a part of the wire matrix, and a whole row or column of mirrors (in the dozens) along a wire could be aligned at a time using a tool to set the distance between adjacent mirrors. Since strings of mirrors can be aligned string by string to form the matrix, for an N×N array, N alignments are performed in the X-direction and N alignments are performed in the Y-direction, resulting in a total number of alignments of 2N rather than $N^2$. This can result in a significant reduction in alignment complexity for a typical array size ranging from 16×16 to 64×64.

Figure 15:
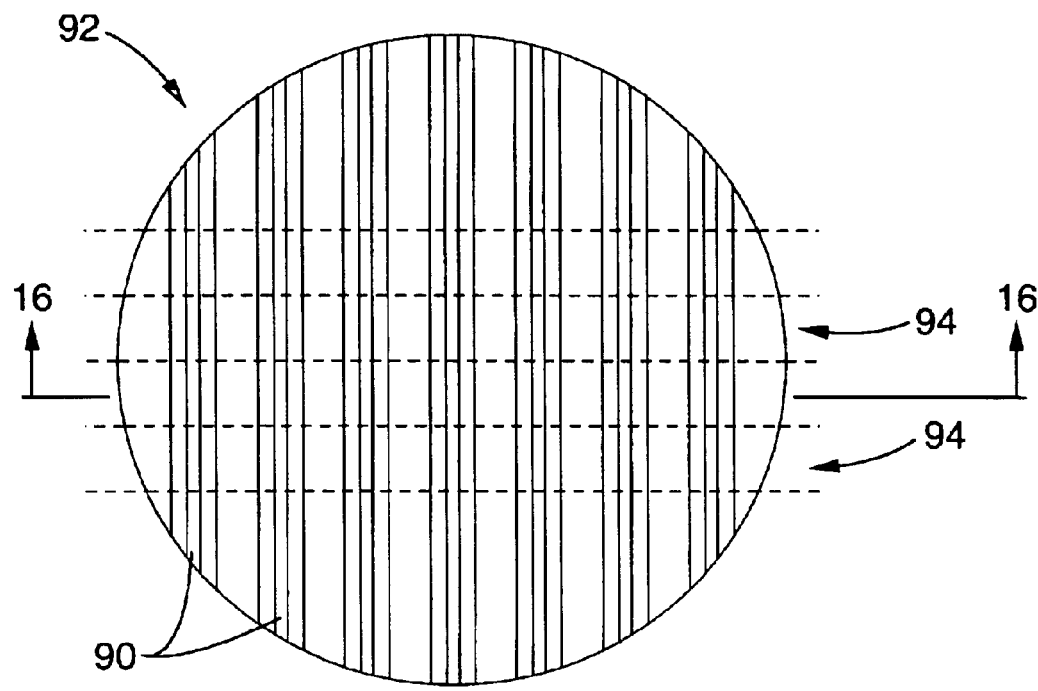
FIG. 15 is a schematic plan view of a wafer depicting fiber bundle support fabrication according to an embodiment of the invention.
Figure 16:
FIG. 16 is a cross-sectional view of the wafer shown in FIG. 15 taken through line 16—16.

Referring now to FIG. 1, FIG. 15 through FIG. 17, the input fiber bundles 12, 20 can be formed in any number of ways. For example, a preferred approach would be to etch a plurality of grooves 90 in a silicon wafer 92 as shown in FIG. 15 and FIG. 16, cut the wafer into a plurality of strips 94, bond the strips into an array 96, and then insert the optic fibers, such as fibers 14, into each groove such that the fibers are held in place in adjacent row fashion as shown in FIG. 1. Note that the grooves shown in FIG. 15 and FIG. 16 have a V-shape with flattened bottoms to make efficient use of space in a thin wafer. However, arcuate or other shaped grooves could be used as well. The ends of the fibers are conformed to a flat plane by having a flat plate, such as the strips 94 of the flat wafer, press them into a plane or press them to be flush with the grooved fiber holders.

Figure 17:
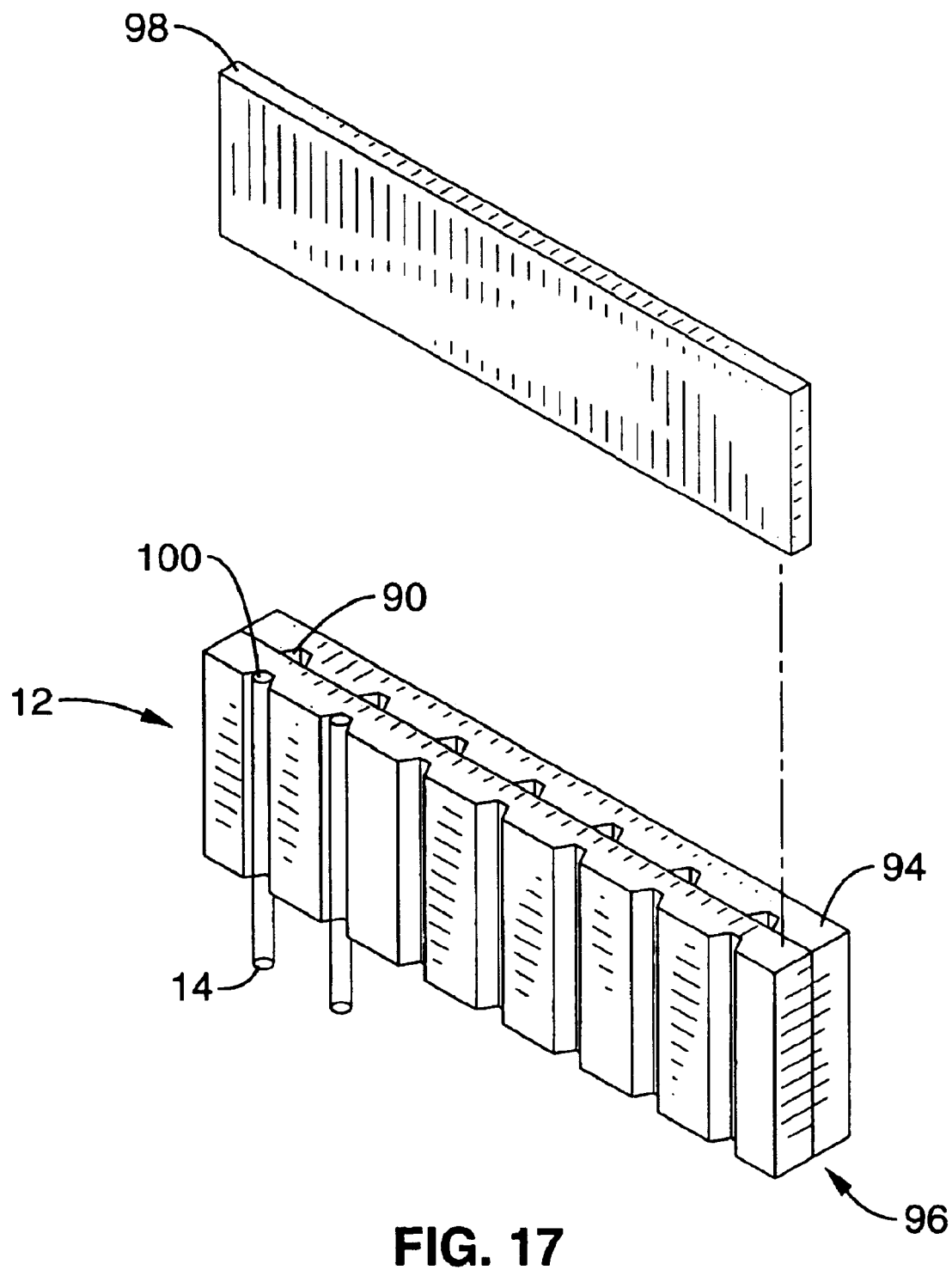
FIG. 17 is a perspective view of a sheet collimator according to the invention.

It will be appreciated that the beams exiting the input fibers and entering the output fibers should be collimated; otherwise, undesired scattering will occur. Collimators of various configurations can be employed, such as conventional GRIN lenses positioned at the end of the optic fibers. Referring to FIG. 17, an example of a sheet collimator 98 is shown. Sheet collimator 98 is preferably placed close to the end 100 of each fiber to generate a collimated beam. By using a collimating lens having a low numerical aperture (NA), such as approximately .0.1, it is possible to form many or all of the collimated lenses for a fiber bundle out in sheets out of a single mold, easing the handling and alignment. All of the molds could have legs or extensions to grip the fibers in precise alignment to the collimating lenses. This sheet fabrication approach for batch processing further enables much smaller collimator lenses to be made (about 1 mm beam diameter), which allows the pitch between lenses (and fibers) to be minimized, and thereby improving the fiber packing density. The collimating lens sheet can further add extensions to act as precise position and angle anchors for the fiber bundle, enabling mass production.

Once the optical cross-connect switch has been fabricated as described above, initial alignment between the input fibers and the first pallet, the first pallet to the second pallet (or second pallet to first pallet), and the second pallet to the output fibers can be achieved by physical verification of the position of beams from target fibers to the mirrors, and then sending test data patterns across the switch. Once the cross-connect switch is operational, a mirror directly above an input fiber in the first pallet will rotate in roll and pitch to randomly address any of the corresponding mirrors in the second pallet directly above an output fiber. The two corresponding mirrors are controlled such that they switch in parallel. Using the beam position sensors on the mirror modules, control circuitry can be used to control the fine settling of the mirrors with correct positioning in minimum time. Note also that bi-directional switching can be achieved by reversing the roles of the input and output fibers, since the mirrors are insensitive to the direction of the beams.

It will also be appreciated that the wire suspension structure is particularly well suited to achieve high packing density of mirrors in a given mirror pallet footprint. To facilitate assembly of a large number of mirror modules into switching arrays with small footprints, the mirror modules themselves should be compact. One way to accomplish this result is to "squeeze" the components by altering their relative positions. For example, referring to FIG. 18 through FIG. 25, an alternate embodiment of reflector assembly 18 is shown. In this embodiment of the invention, bobbin 60 and coils 64 are similar in configuration and mounting to those shown in FIG. 7 through FIG. 9, except that coils 64 have been rotated in position ninety degrees so that they essentially stand on end and are attached to mounting pads 102 (see FIG. 19) by gluing or other conventional bonding method. As a result, the overall dimensions of the bobbin and coil assembly are reduced. As with previous embodiments, bobbin 60 carries a mirror M of various sizes and shapes depending on the desired application and, for example, can be mounted to bobbin 60 in the same manner as described above with reference to FIG. 7 to FIG. 9 and FIG. 12. To keep bobbin 60 lightweight, a receptacle (not shown) extends through bobbin 60 beneath mirror M as previously shown. Preferably, the upper surface (e.g., face) of mirror M is flush with the upper edge of the bobbin and the entire assembly is designed such that the center of gravity of the entire assembly is at the center line of the place of the flexible support wires 68 that function as springs.

Figure 18:
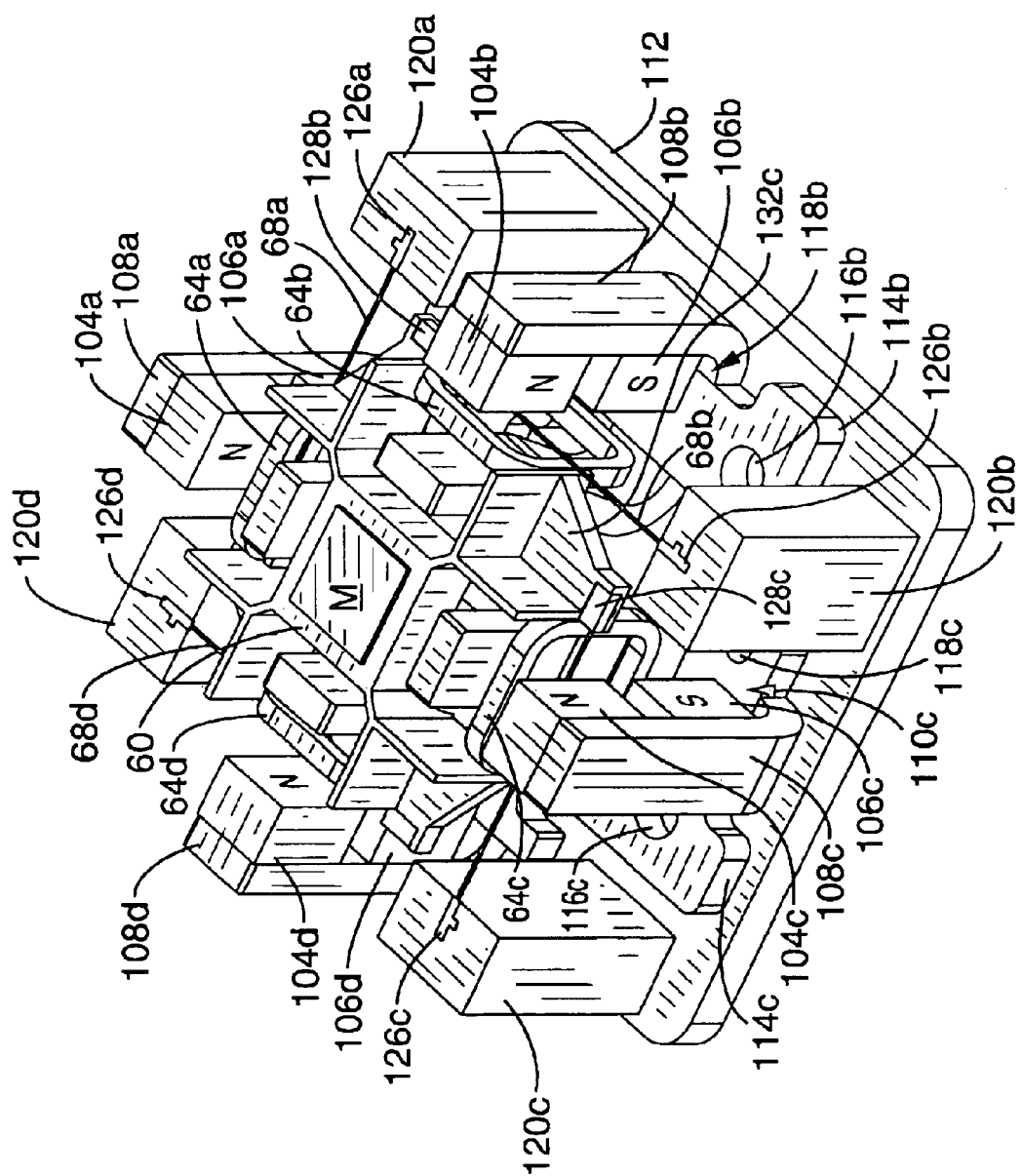
FIG. 18 is a perspective view of a reflector assembly according to a fourth embodiment of the invention.
Figure 20:
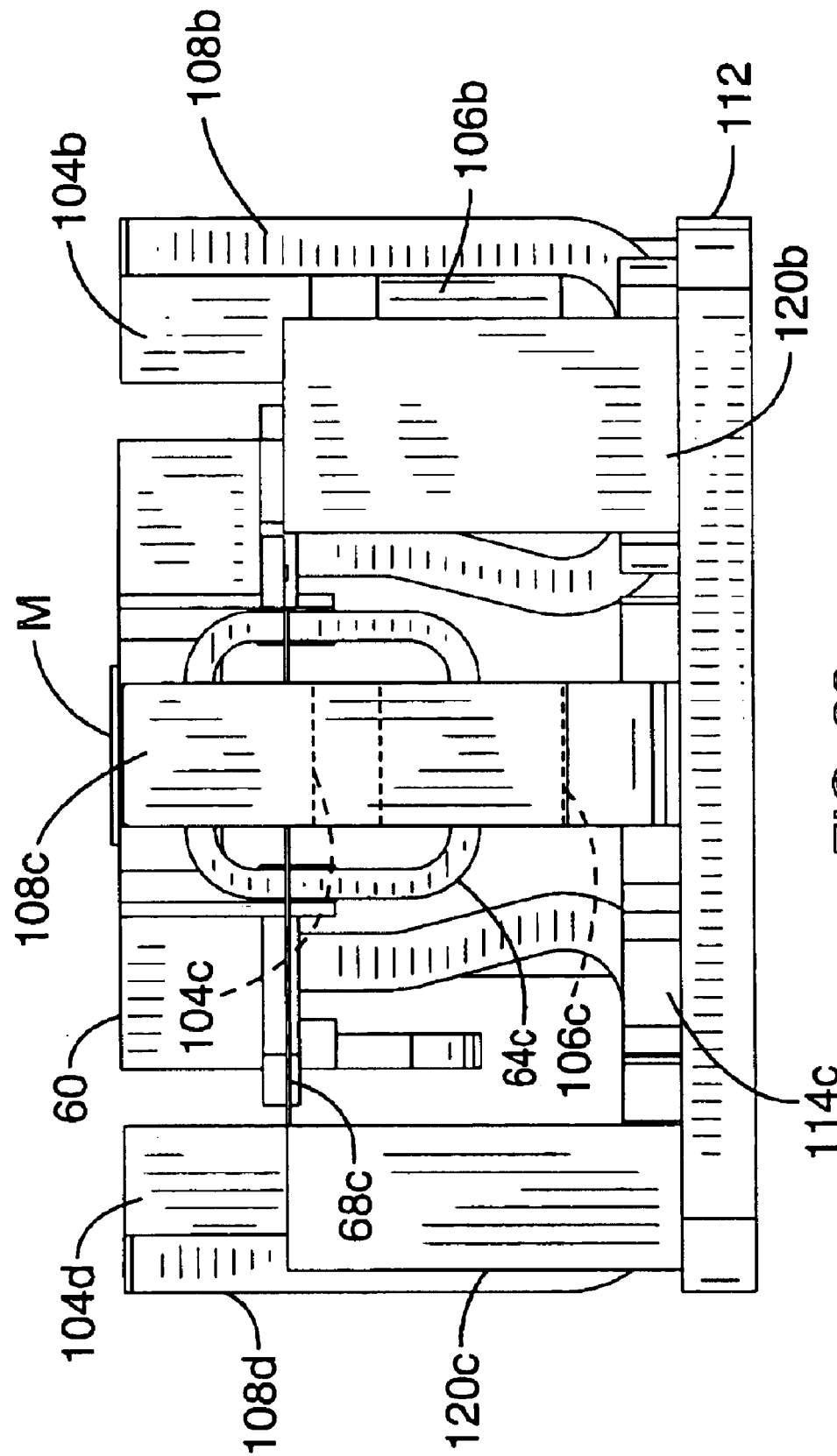
FIG. 20 is a side view of the reflector assembly shown in FIG. 18.

In this embodiment of the invention, note that the magnets do not extend through the center of the coils as in FIG. 7 through FIG. 9. Because the position of the magnets has been rotated, a different magnet configuration is required. Here, two magnets having opposite poles are associated with each coil. For example, an upper magnet 104 is associated with the upper portion of coil 64 and a lower magnet 106 is associated with the lower portion of coil 64c. As can be seen in FIG. 18 and FIG. 20, the approximate midpoints of the upper and lower magnets are aligned with the upper and lower coils, respectively.

The magnets are supported by a U-shaped return plate 108 positioned around the coil 64. Return plates 108 are fabricated from metal or other material through which lines of magnetic flux will pass. In this way, lines of magnetic flux will follow a closed loop between the poles of the magnets by passing through the upper and lower portions of the coils and the return plate. Because the return plates are made from a metallic material, in order to function properly, the lower magnets 106 must be held above the bottom of the return plates such that a small gap 110 is created. Note that the size of gap 110 is not critical.

The return plates 108 are in turn mounted to a base plate 112 using an conventional means for support Base plate 112 is preferably fabricated from a durable lightweight material such as plastic or the like. In this regard, note also that base plate 112 is shown as if a separate base plate would be used with each reflector module. However, for 1×N or N×N switches, base plate 112 typically would be a single base plate on which all of the modules would be mounted to form a pallet as described previously.

Figure 19:
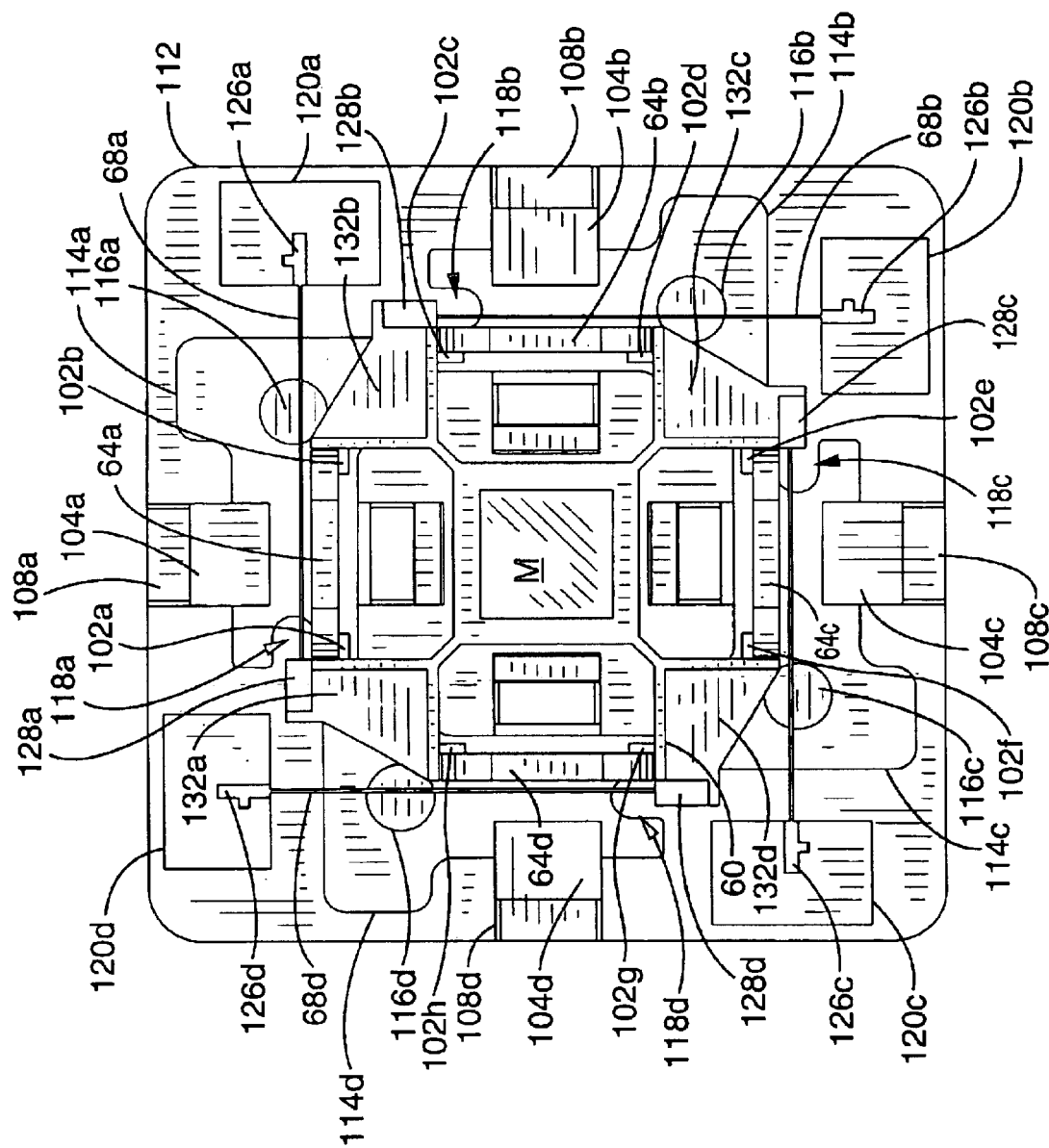
FIG. 19 is a top plan view of the reflector assembly shown in FIG. 18.
Figure 24:
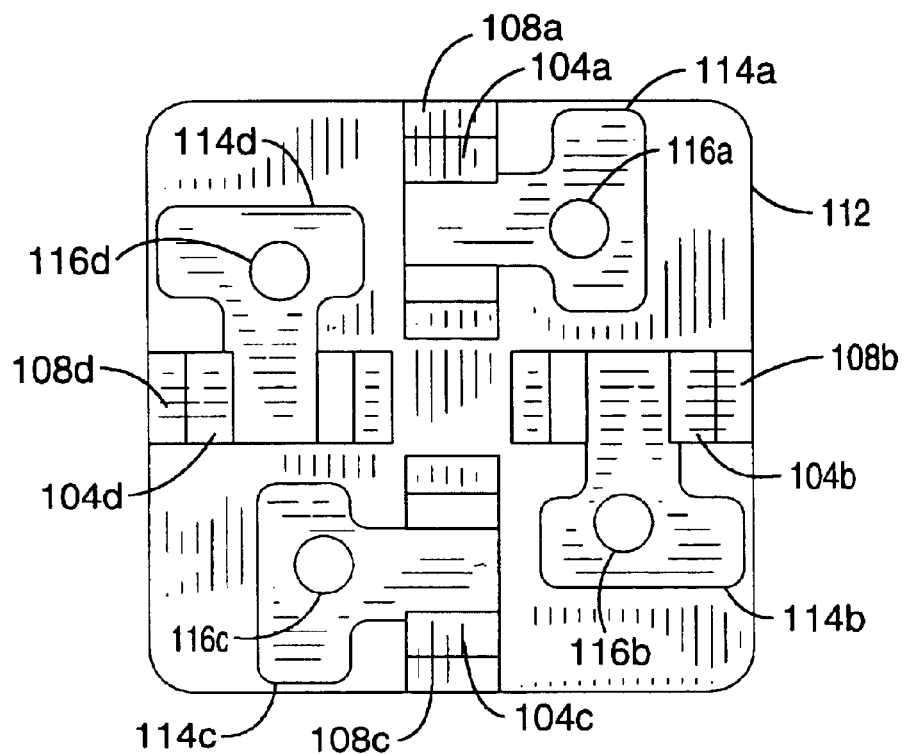
FIG. 24 is a top plan view of the stationary base shown in FIG. 23.
Figure 25:
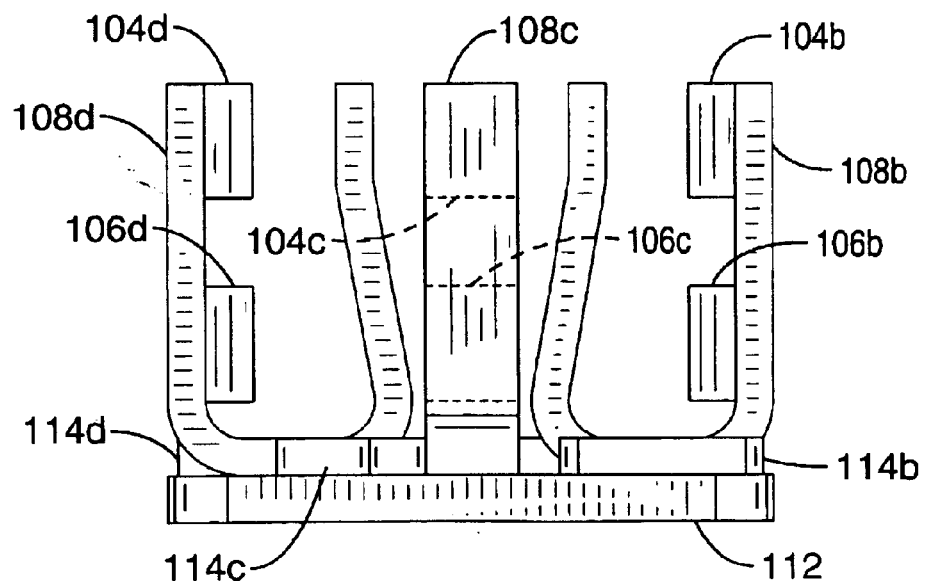
FIG. 25 is a side view of the stationary base shown in FIG. 23.

Referring to FIG. 18 and FIG. 19, to facilitate alignment, return plates 108 preferably have integral mounting tabs 114 that fit into an oversized cavity (not shown) in the base plate of a similar shape. A hole 116 and slot 118 are provided for receiving a screw-type fastener or the like (not shown) to allow mounting position of the return plate to be adjusted. The size and shape of the mounting tabs are not critical, and various combinations of holes and slots can be employed. For example, FIG. 24 shows an embodiment of the return plates where the portion of the mounting tabs having the slot has been eliminated.

Note also that the leg of the return plates opposite the magnets is curved. This curvature in combination with the size of the opening between the coils and the bobbin, facilitates rotation of the bobbin without the coils hitting the return plates. While other degrees of motion can be employed, approximately fifteen degrees of rotational motion is generally sufficient.

Figure 21:
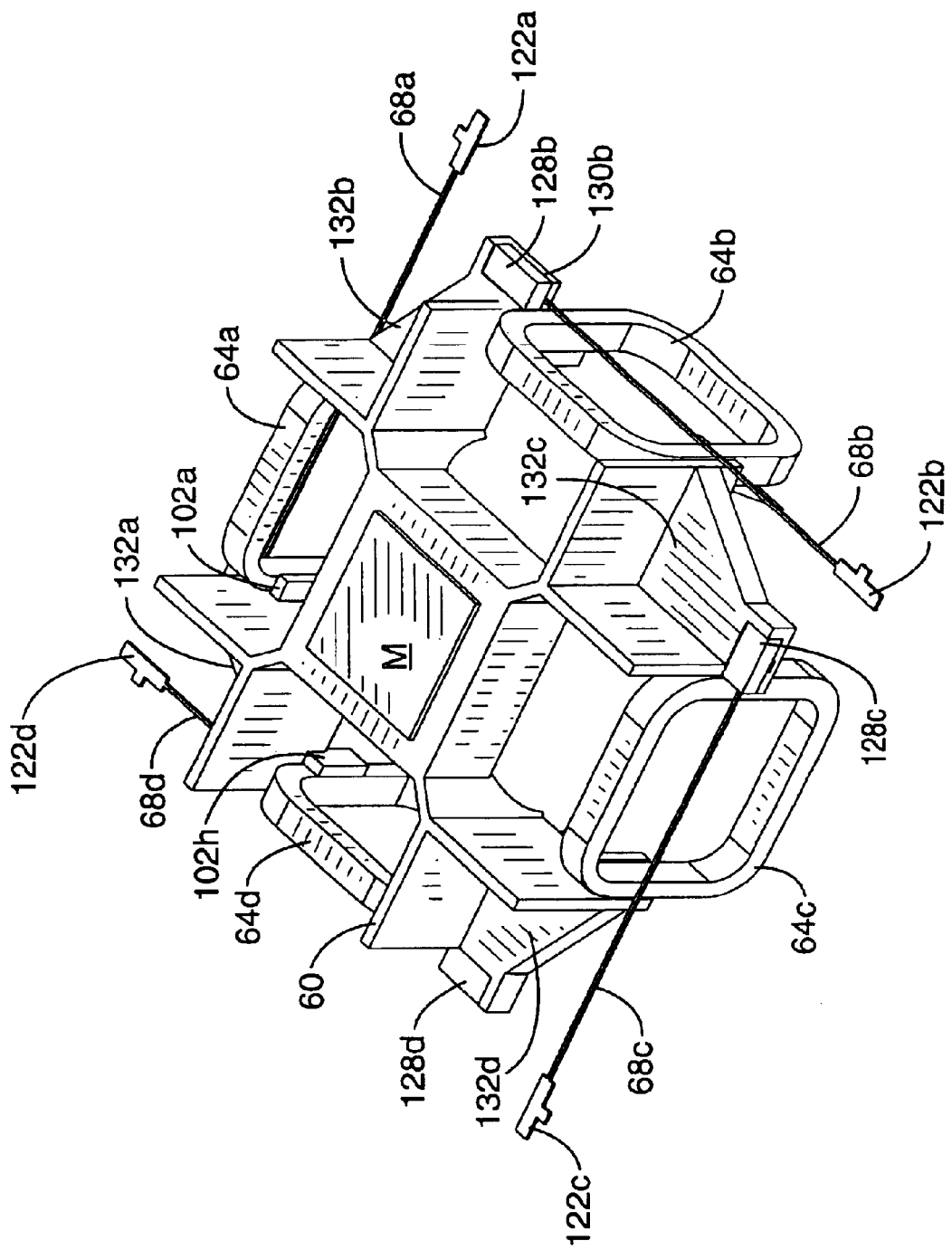
FIG. 21 is a perspective view of the moveable bobbin portion of the reflector assembly shown in FIG. 18.
Figure 22:
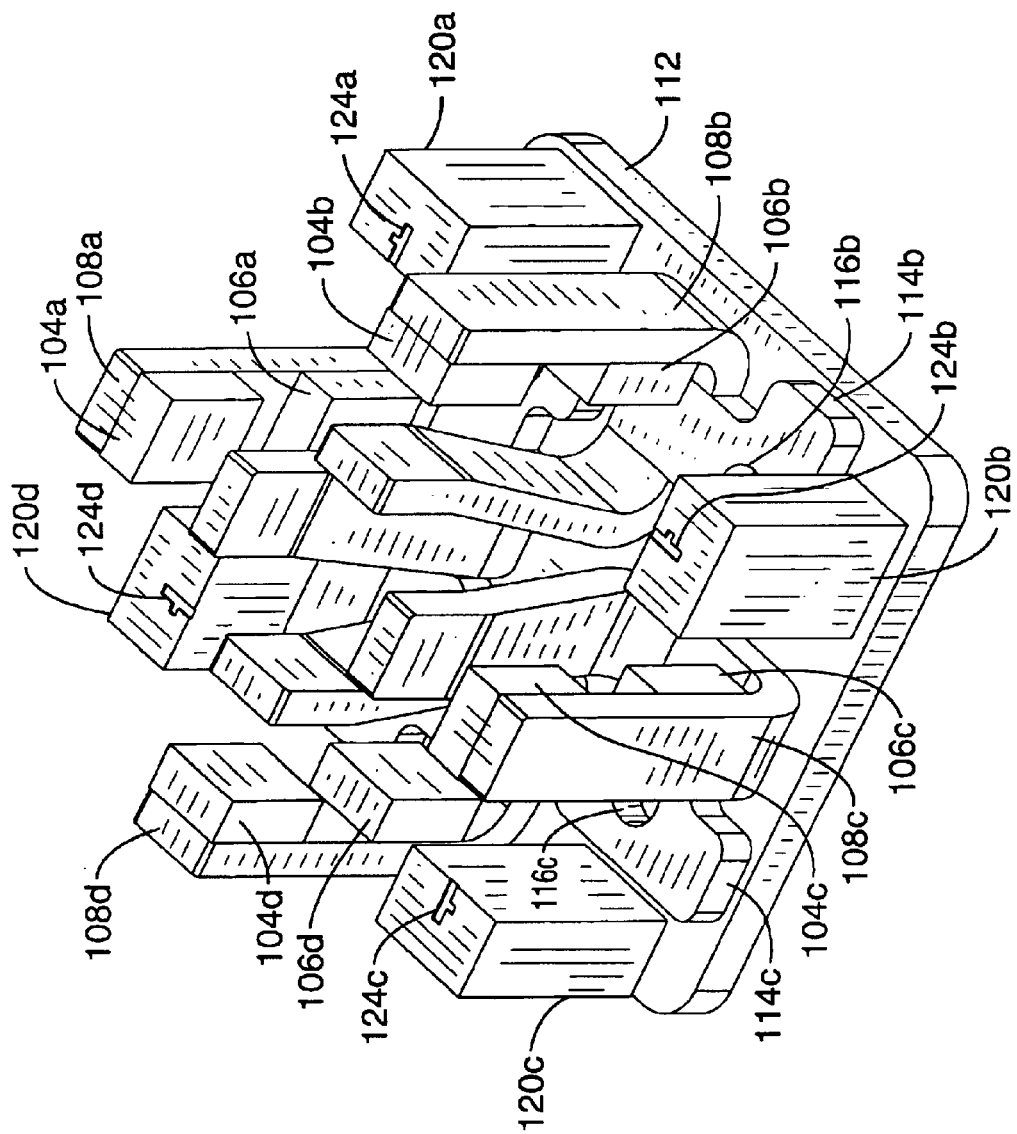
FIG. 22 is a perspective view of an alternative embodiment of the stationary base portion of the reflector assembly shown in FIG. 18 employing truncated magnet mounts.
Figure 23:
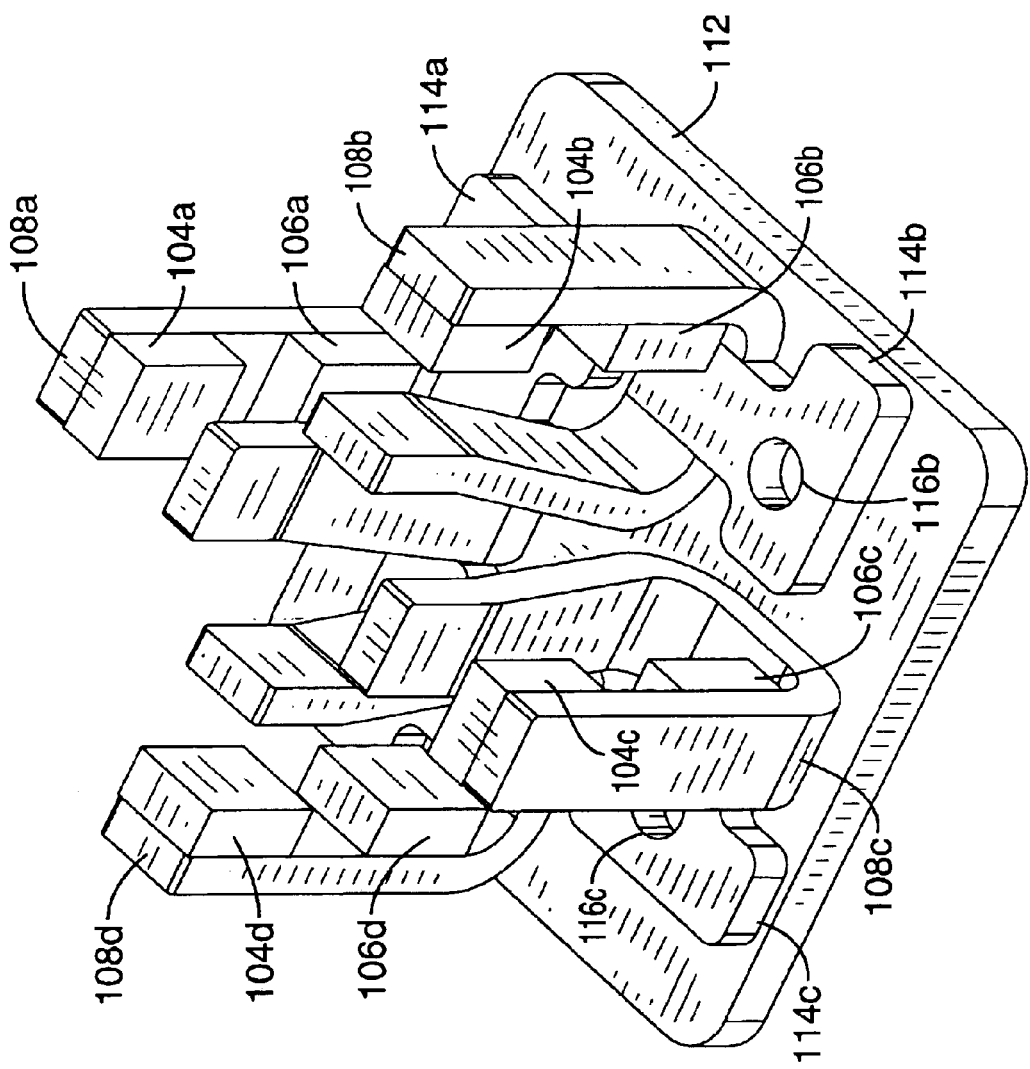
FIG. 23 is a perspective view of the stationary base shown in FIG. 22 with the support posts removed.

This embodiment of the invention also demonstrates a further variation in the configuration of support wires 68. As discussed previously, support wires 68 function as wire springs that flex to permit rotation of bobbin 60 resulting from energizing one or more of coils 64 so that a beam of light impinging on the mirror surface can be steered. As can be seen, in this embodiment of the invention, support wires 68 are arranged in a somewhat pinwheel configuration. One end of each support wire 68 is attached to bobbin 60 and the other end is attached to a support post 120 connected to, and extending upward from, support base 112. Support posts 120 are preferably fabricated from a durable lightweight material such as plastic or the like. Wires 68 can be attached to support post 120 using any conventional bonding technique. To facilitate fabrication, however, it may be desirable to use a bonding tab 122. Referring also to FIG. 21 and FIG. 22, bonding tab 122 is attached to the end of the wire 68 and placed into a receptacle 124 in the support post. The bonding tab can then be bonded to the support post or, in this embodiment, receptacle 124 is sufficiently deep that a retention cap 126 of similar size and shape can be snap fit into receptacle 124 over bonding tab 122. The other end of the support wire 68 is attached to bobbin 60, again using an conventional bonding technique. In the embodiment shown, however, a bonding tab 128 fits within a receptacle 130 at the edge of a shelf-like cross-brace 132 which also functions to stiffen the assembly and reduce vibration due to high rotational frequencies. Power connections to a coil 64 are made in the same or similar manner as previously described such as, for example, running power wires to a support post 104, connecting the power wires to insulated traces printed on a corresponding wire 68, connecting the insulated traces to similar traces on bobbin 60, and connecting the traces on bobbin 60 to the coil.

Lastly, referring more particularly to FIG. 22 through FIG. 25, as indicated above the slots 118 in mounting tab 114 on return plates 108 are optional. By eliminating those slots, mounting tabs 114 can be truncated as shown in FIG. 22 through FIG. 25. This allows the footprint of the module to be made even smaller, because it reduces the clearance between return plates and adjacent mounting tabs.

Figure 26:
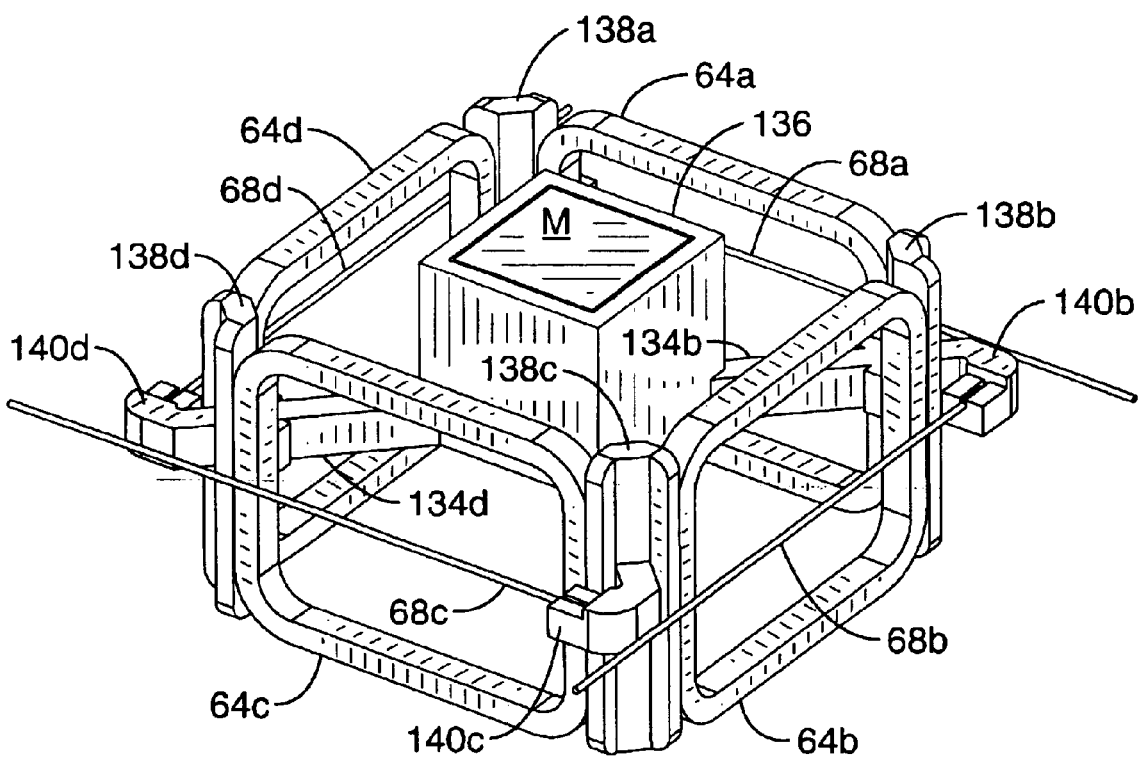
FIG. 26 is a perspective view of an alternative embodiment of the moveable bobbin shown in FIG. 21 employing compact coil supports.
Figure 27:
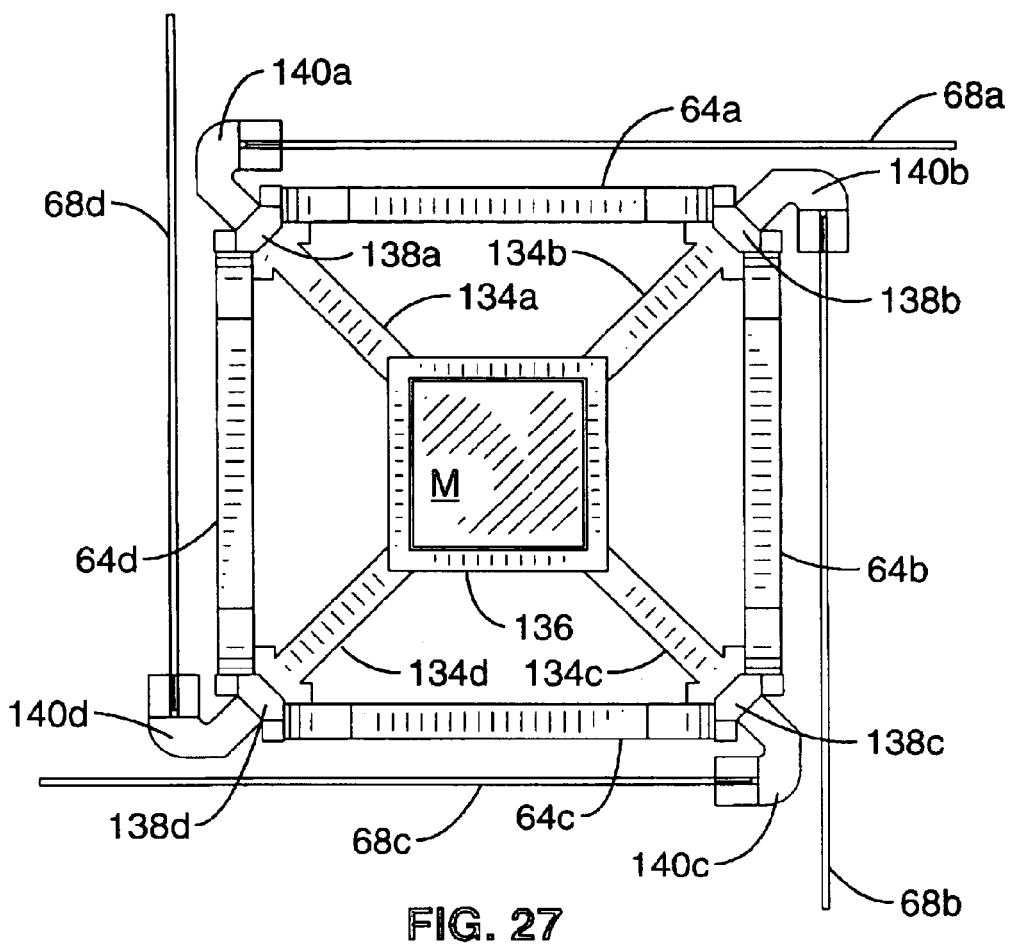
FIG. 27 is a top plan view of the moveable bobbin shown in FIG. 26.
Figure 28:
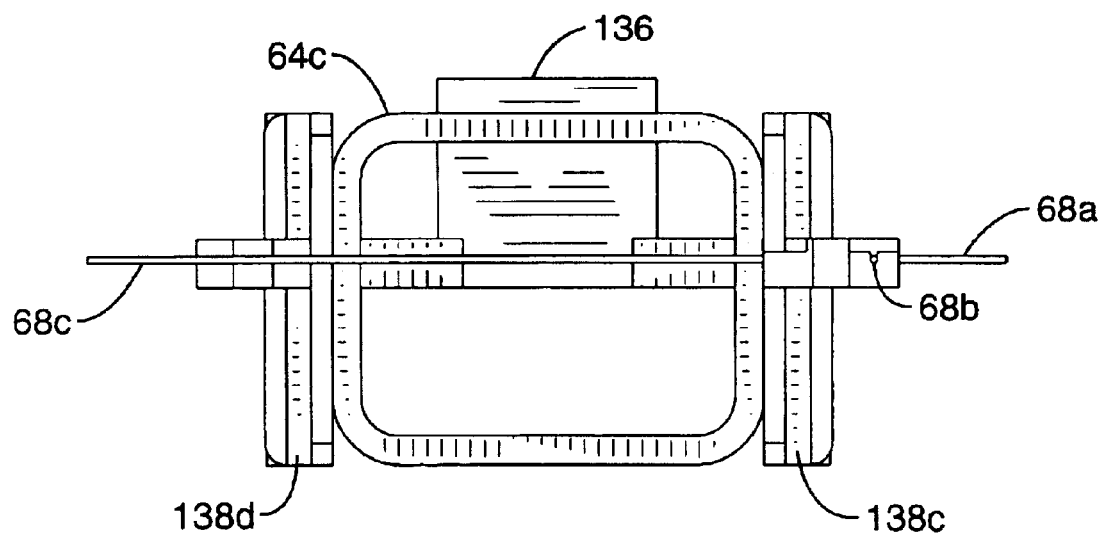
FIG. 28 is a side view of the moveable bobbin shown in FIG. 26.
Figure 29:
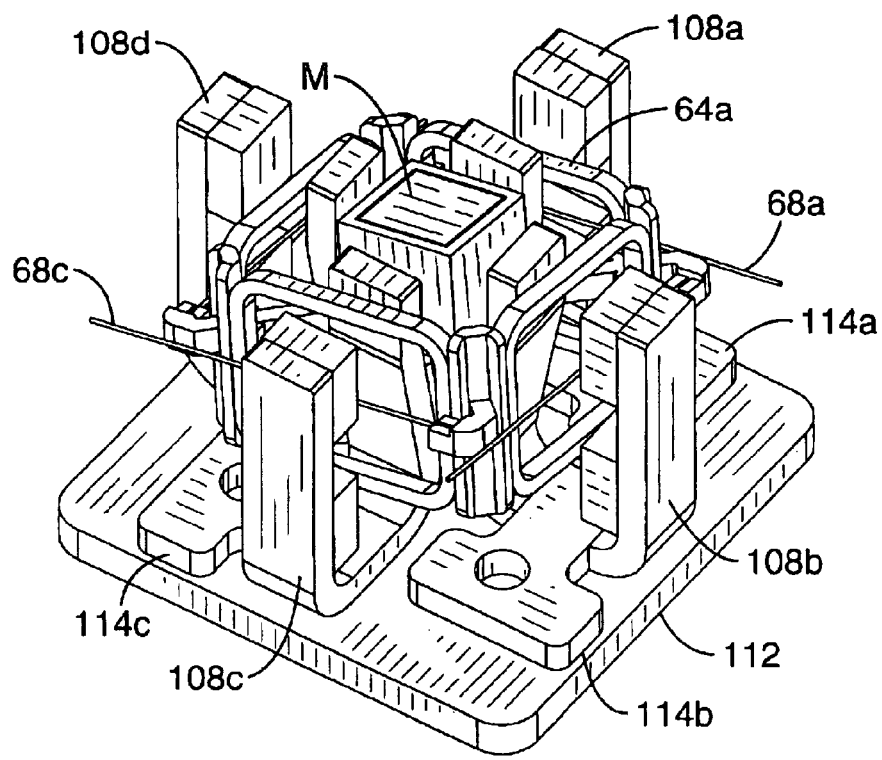
FIG. 29 is a perspective view of a reflector assembly employing the stationary base of FIG. 23 and movable bobbin of FIG. 26, with the bobbin shown tilted downward to the left.
Figure 30:
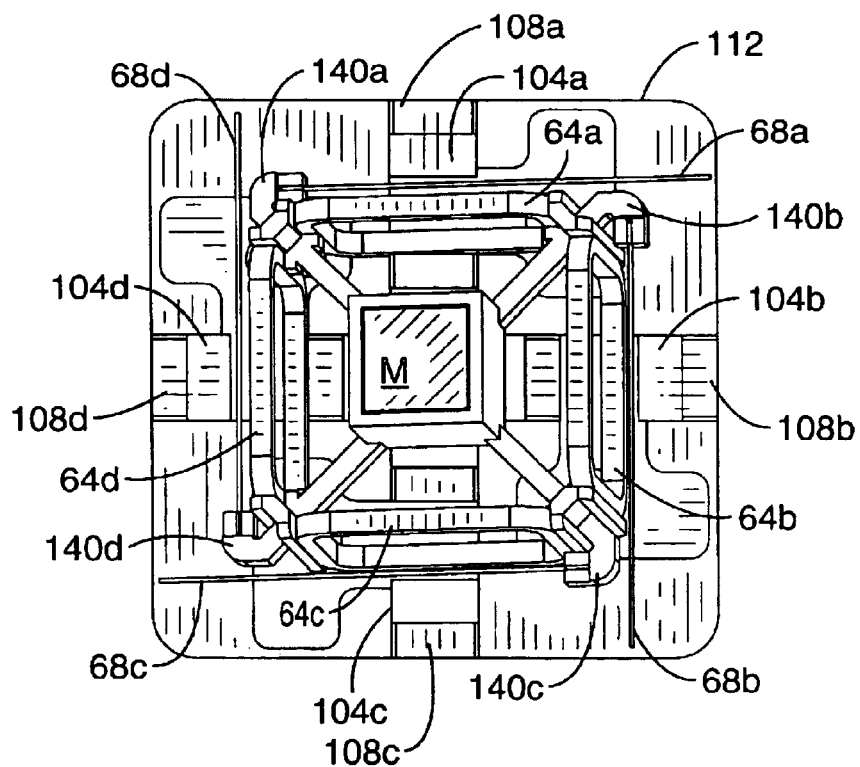
FIG. 30 is a top plan view of the reflector assembly shown in FIG. 29.
Figure 31:
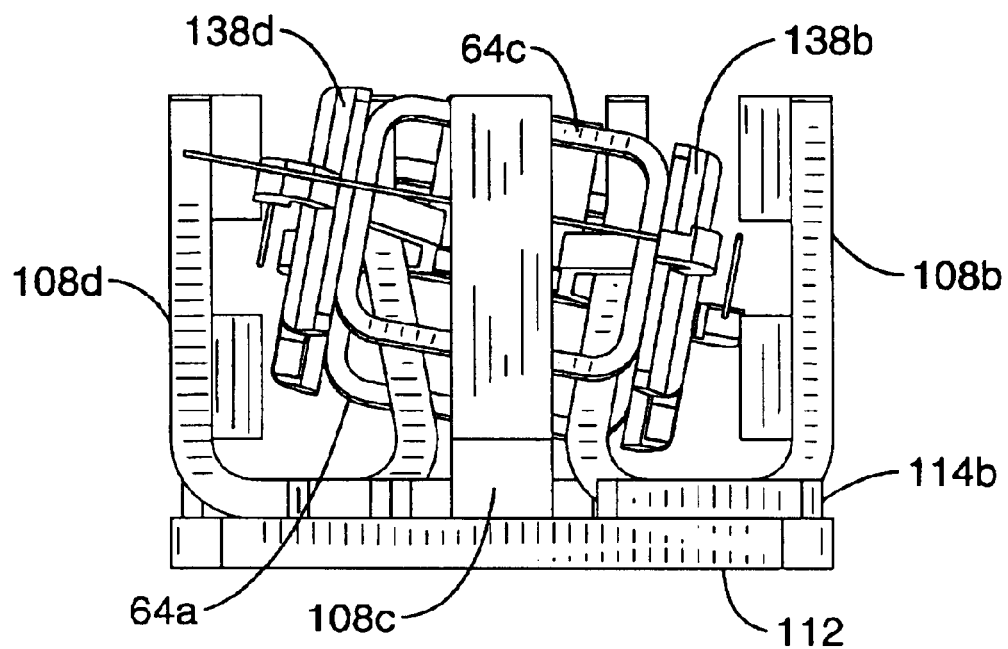
FIG. 31 is a side view of the reflector assembly of FIG. 29 with the bobbin shown tilted to the right.
Figure 32:
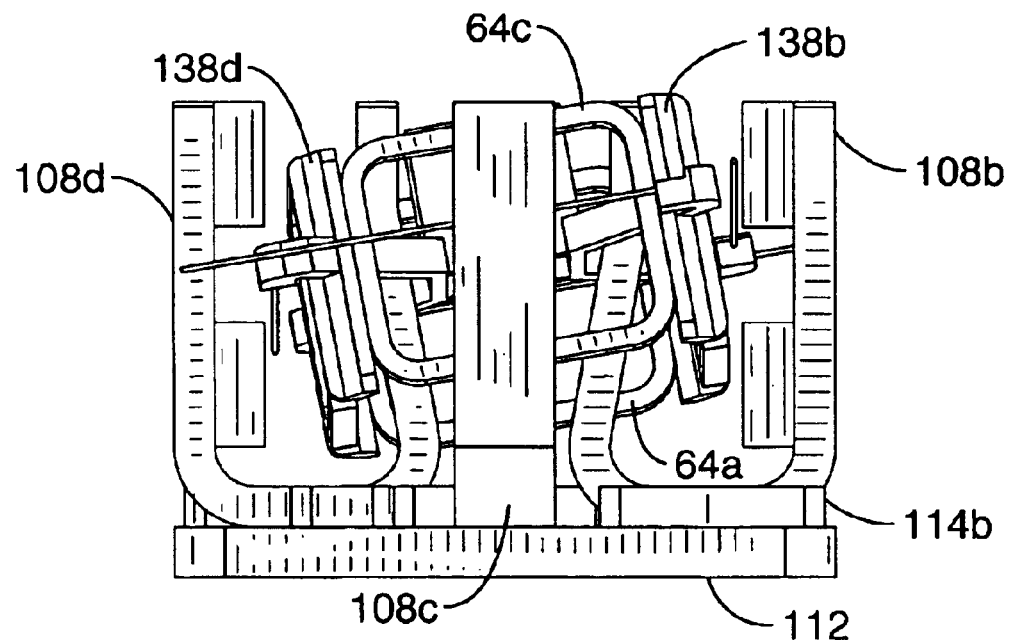
FIG. 32 is a side view of the reflector assembly of FIG. 29 with the bobbin shown tilted to the left.
Figure 33:
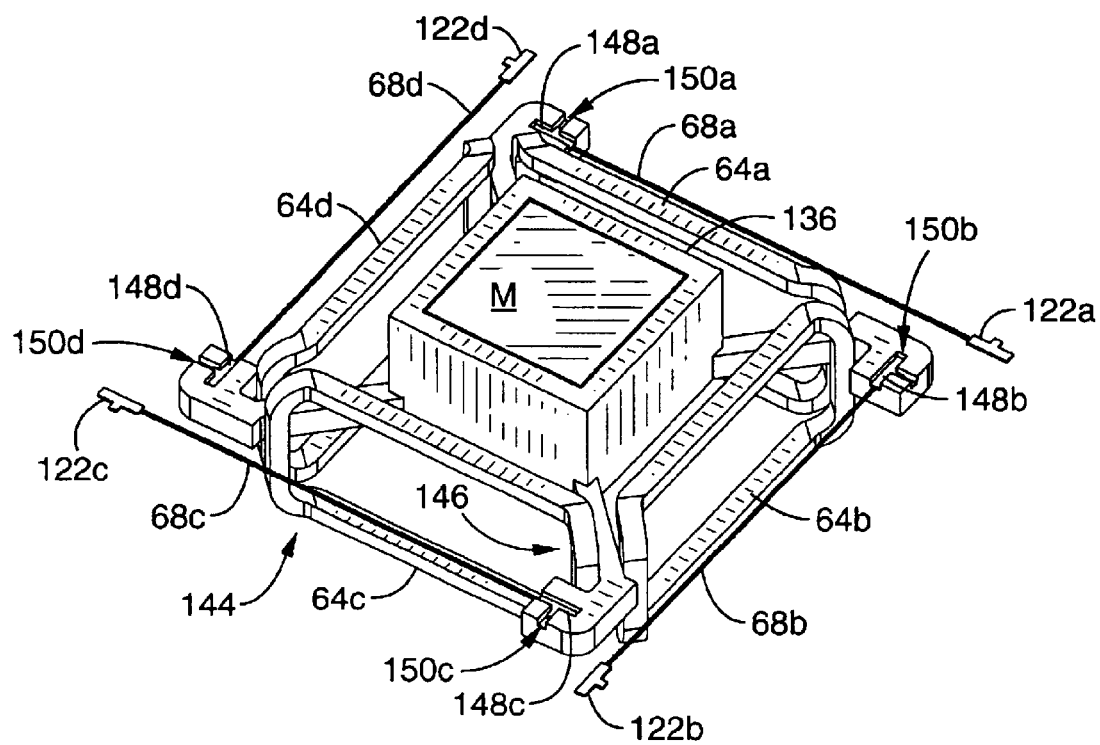
FIG. 33 is a perspective view of an alternative embodiment of the bobbin shown in FIG. 26 employing coils with angled sides.
Figure 34:
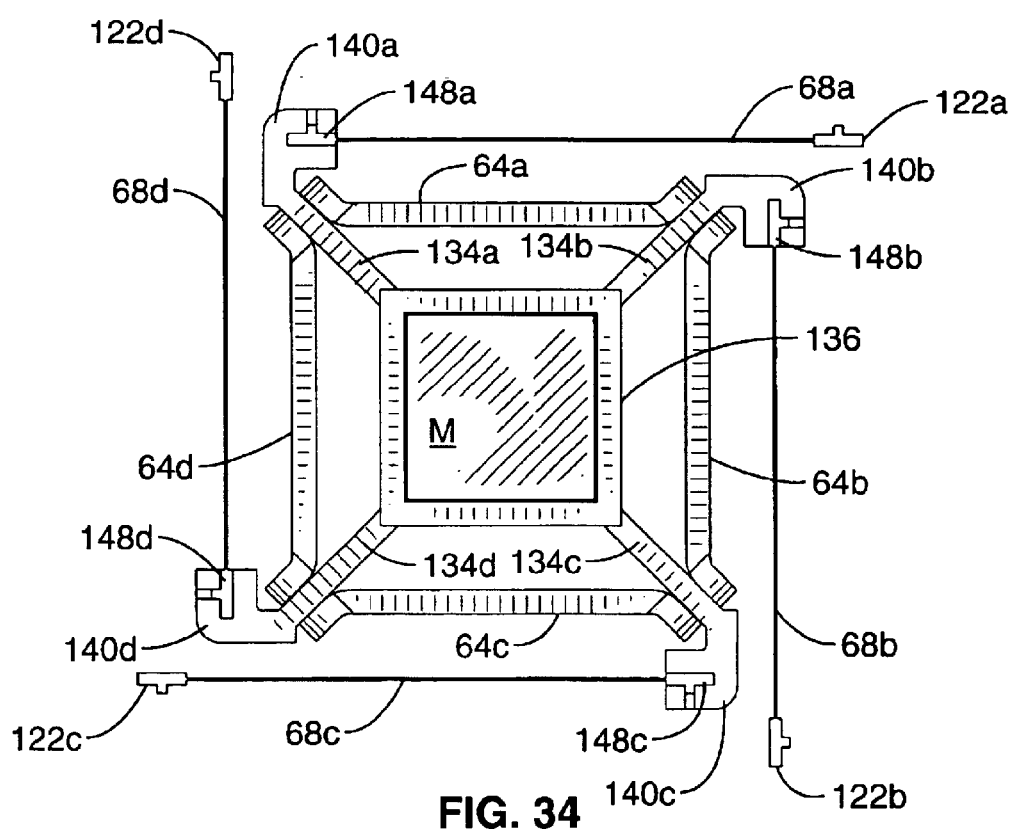
FIG. 34 is a top plan view of the bobbin shown in FIG. 33.

Referring now to FIG. 26 through FIG. 28, a still further embodiment of bobbin 60 is shown which tends to be compact than shown in FIG. 18 through FIG. 21 and is particularly suited to use with the more compact base configuration shown in FIG. 22 through FIG. 25. In this embodiment, a plurality of struts 134 extend outward from the four corners of a mirror holder 136 and terminate at coil mounting supports 138. Wire support arms 140 extend from coil mounting supports 138 for retention of wires 68 in slots 142. Note in this regard that wires 68 could be attached to support arms 140 in various other ways, including those described previously. Also, mounting tabs 124 are not shown in these figures to again illustrate that wires 68 can be attached to posts or other support structures using various alternative mounting methods. FIG. 29 through FIG. 32 illustrate the rotational characteristics of bobbin 60. FIG. 33 and FIG. 34 show an alternative embodiment of the configuration of FIG. 26 through FIG. 32. Instead of coils 64 being flat, in this embodiment of the invention the ends 144, 146 of coils 64 are bent and are attached directly to struts 134 instead of to coil mounting supports 138. Elimination of coil mounting supports 138 and bending the ends of the coils as shown allows the coils to be placed closer to mirror holder 136 for a more compact design. Note also that wires 68 are shown attached to wire support arms using bonding tabs 148 and a corresponding receptacle 150 having the same configuration as bonding tabs 122 to further illustrate the various ways that wires 68 can be attached. It will be appreciated that, in the various embodiments heretofore described, square mirror holders have been employed. However, the mirror holders may be round, rectangular, elliptical, and the like, as can be the mirrors themselves.

FIG. 35 through FIG. 40 show still further embodiments of the invention and illustrate that the bobbin can have shapes other than the generally square planar shape of bobbin 60 described above. For example, these embodiments employ a hemispherical-shaped bobbin 152. These embodiments also illustrate the various configurations of support wires 68 that can be employed. By way of example, in these embodiments support wires 68 have a folded-back or serpentine configuration similar to that shown in FIG. 11.

Figure 35:
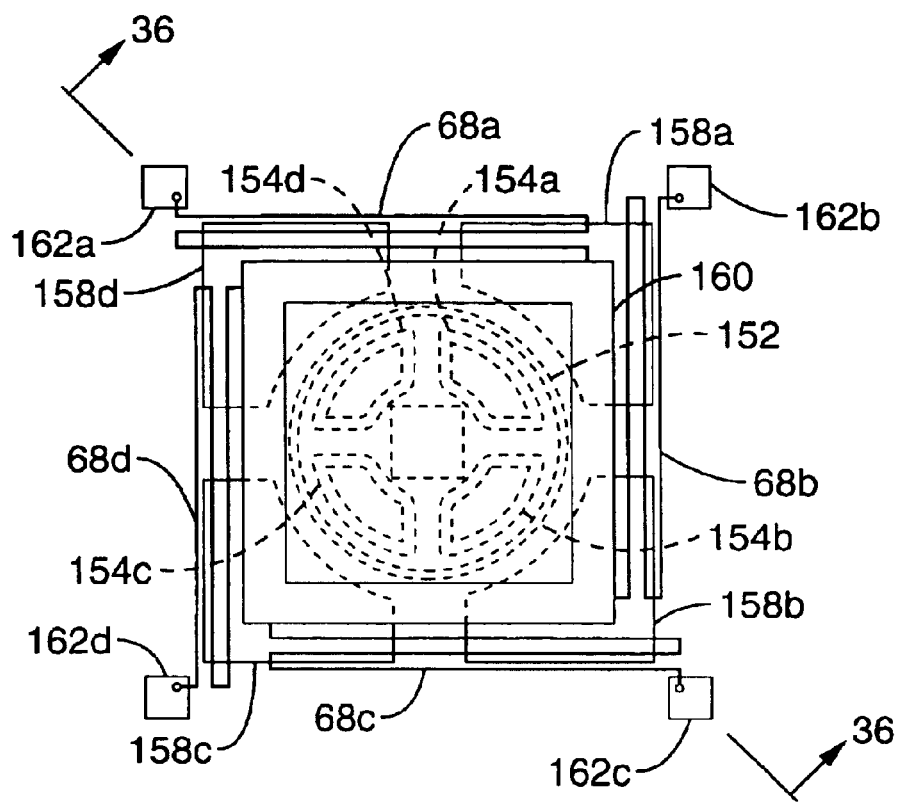
FIG. 35 is a top plan view of an embodiment of a reflector assembly according to the present invention employing a hemispherical-shaped bobbin and unitary magnets.
Figure 36:
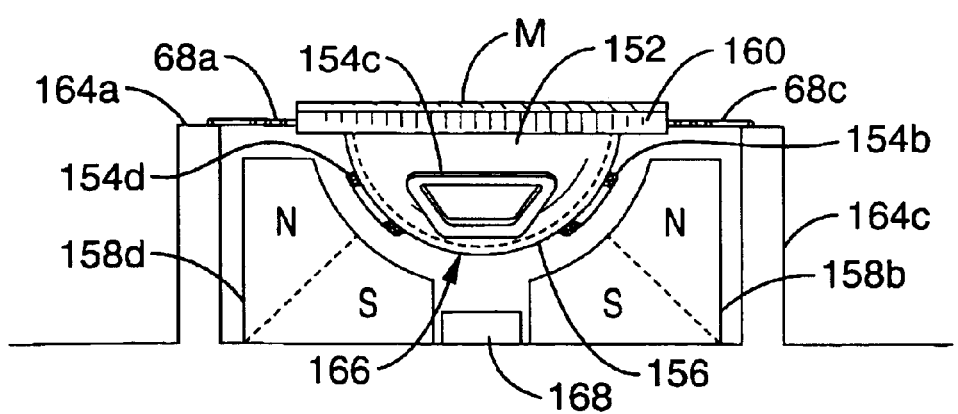
FIG. 36 is a side view in partial cross section of the reflector assembly shown in FIG. 35.
Figure 37:
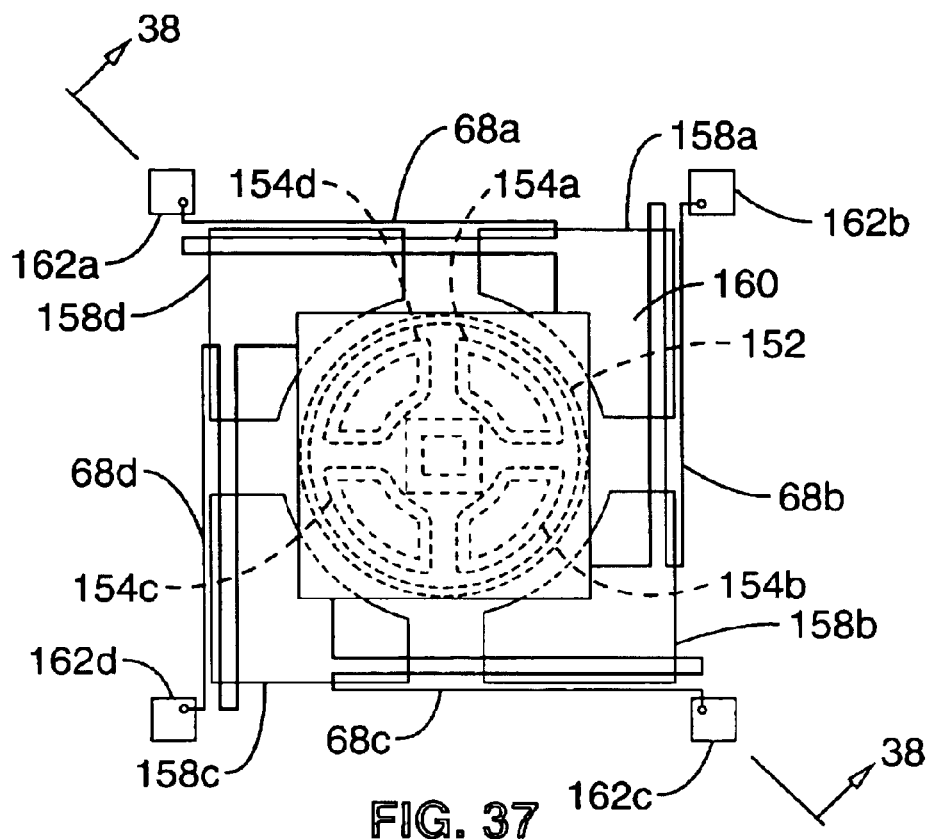
FIG. 37 is a top plan view of an alternative embodiment of the reflector assembly shown in FIG. 35 employing a mirror mount extension.
Figure 38:
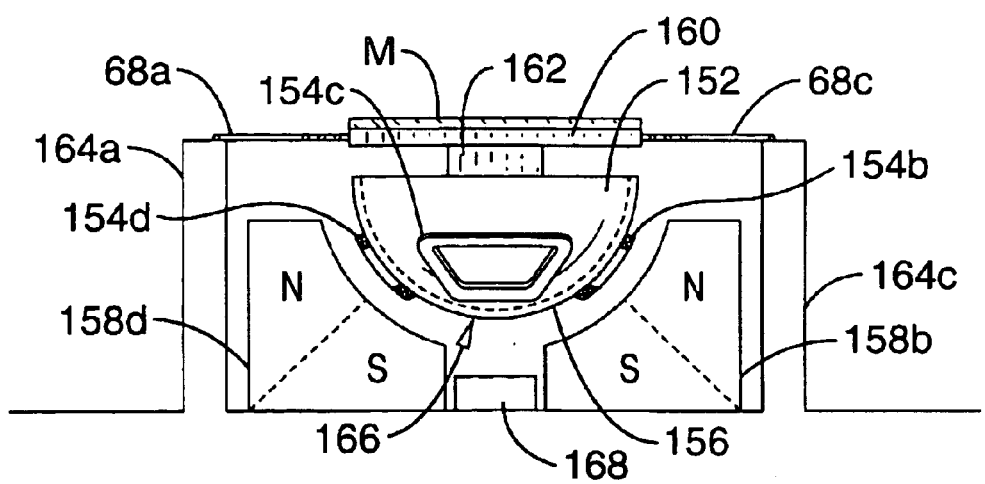
FIG. 38 is a side view in partial cross section of the reflector assembly shown in FIG. 37.

Referring first to the embodiment shown in FIG. 35 and FIG. 36, four preformed coils 154 having a generally flat trapezoidal shape are attached to the outer surface 156 of bobbin 152 using any conventional bonding technique. Alternatively, the coils could be printed directly onto bobbin 152 using conventional techniques. A plurality of magnets 158 are provided, one such magnet associated with each coil. Magnets 158 are "cup-shaped" in that they have generally concave surfaces 160 opposing outer surface 156 of bobbin 152 that conform to the curvature of bobbin 152. This permits bobbin 152 to rotate above magnets 158 without surface impingement. A mirror mount 160 is attached to, or integrally formed with, bobbin 152 for accommodating mirror M. In FIG. 35 and FIG. 36, mirror mount 160 is flush with the upper portion of bobbin 152. Alternatively, a standoff 162 could be used to raise mirror mount 160 as shown in FIG. 37 and FIG. 38.

Figure 39:
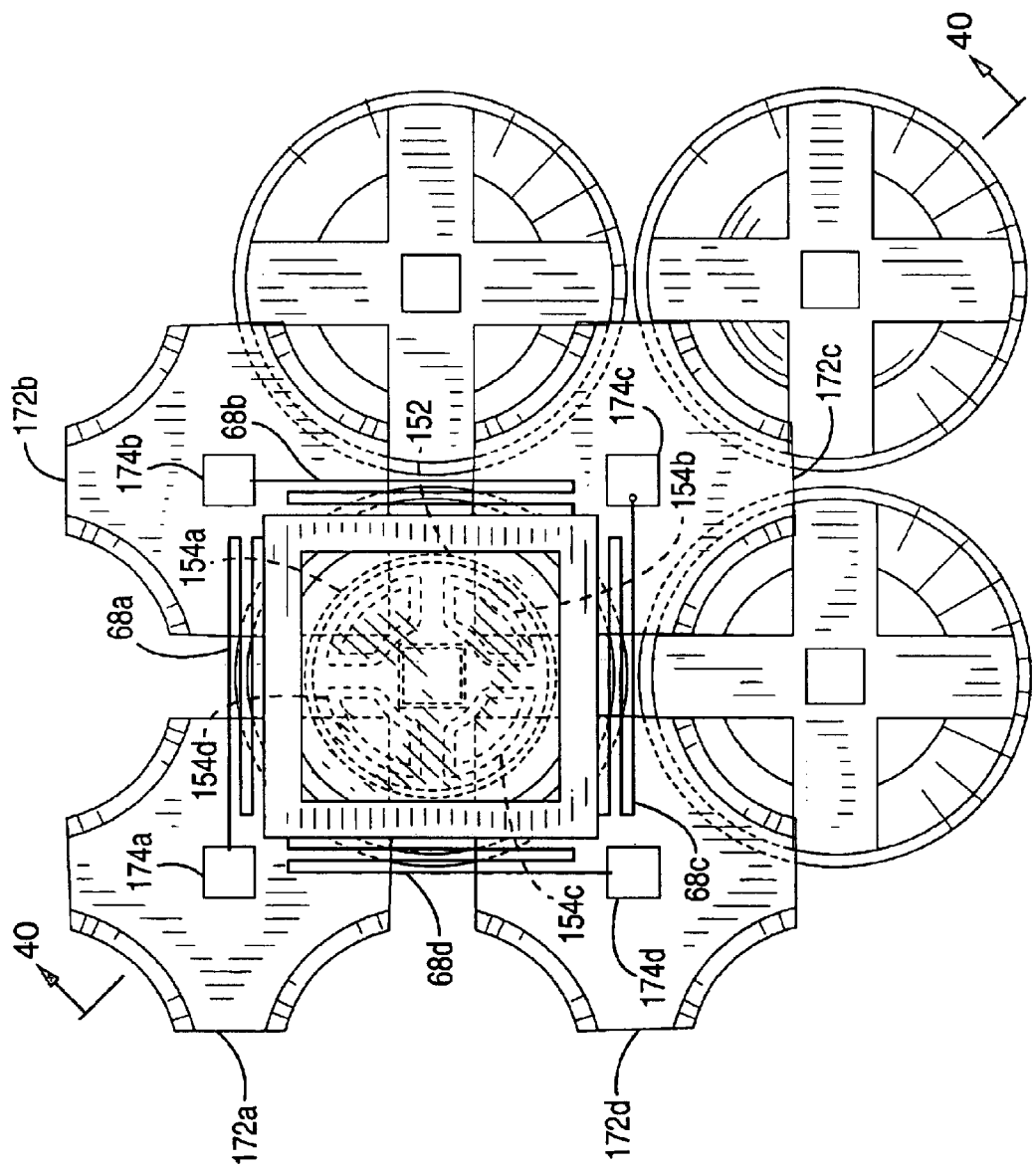
FIG. 39 is a top plan view of a reflector assembly in an array of reflector assemblies according to a embodiment of the invention employing a hemispherical bobbin and combination magnets/support posts.
Figure 40:
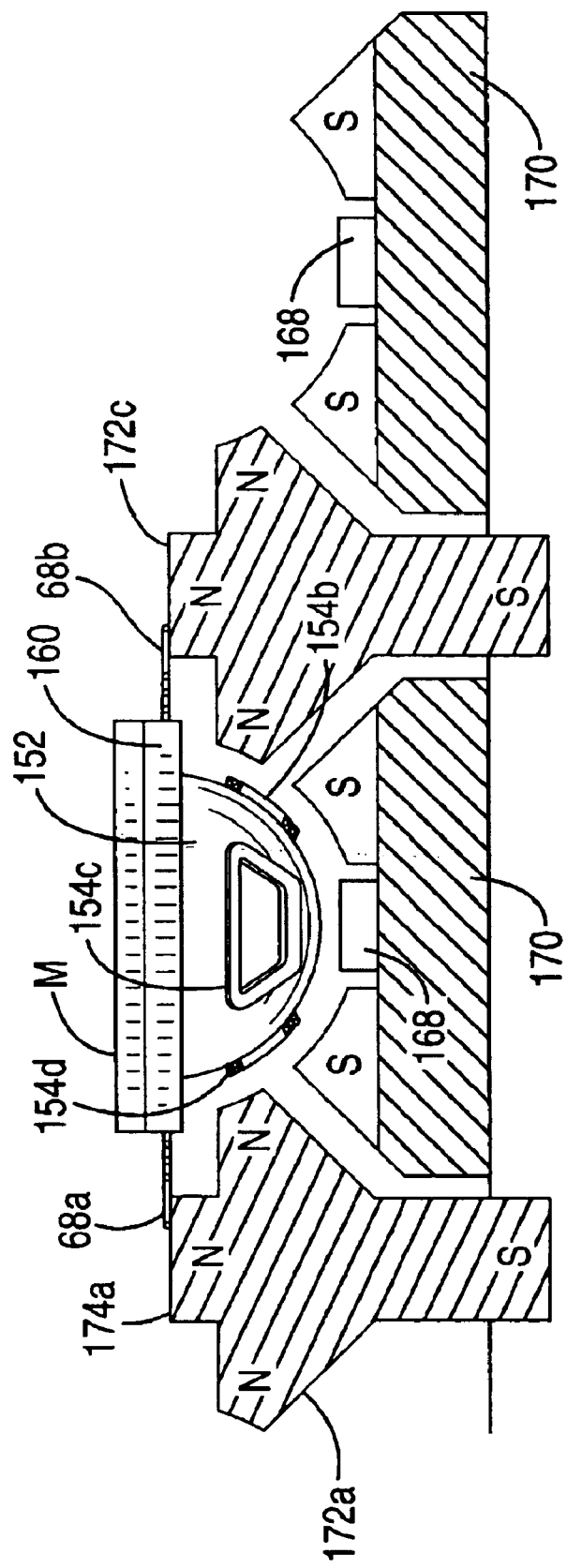
FIG. 40 is a side view in partial cross section of the reflector assembly shown in FIG. 39.

In the embodiments shown in FIG. 35 through FIG. 38, one end of each of the wires 68 is attached to mirror mount 160 and the other end of each of the wires is attached to a support post 164. In this way, bobbin 152 is suspended above magnets 158 and can be made to freely rotate in the desired directions by selectively energizing coils 154 as with the previously described embodiments. Note also that these embodiments of the invention illustrate an alternative manner of detecting the position of mirror M. Here, a position grid 166 or the like is patterned onto the outer surface of bobbin 152 at its central apex and a photodetector 168 is used to sense the position of bobbin 152 (and hence mirror M) based on the markings on the surface of the bobbin. Note also that, as an alternative to employing the unitary magnets 158 that provide both magnetic poles as shown in FIG. 35 through FIG. 38, it is also possible to employ split magnets as shown in FIG. 39 and FIG. 40. In this embodiment of the invention, a cup-shaped lower magnet 170 exposes provides one the two poles needed to generate lines of flux and upper magnets 172 provides the second pole. The embodiment shown in FIG. 39 and FIG. 40 also illustrates upper magnets 172 having posts 174 so that upper magnets 172 can also function as support posts for wires 68.

Figure 41:
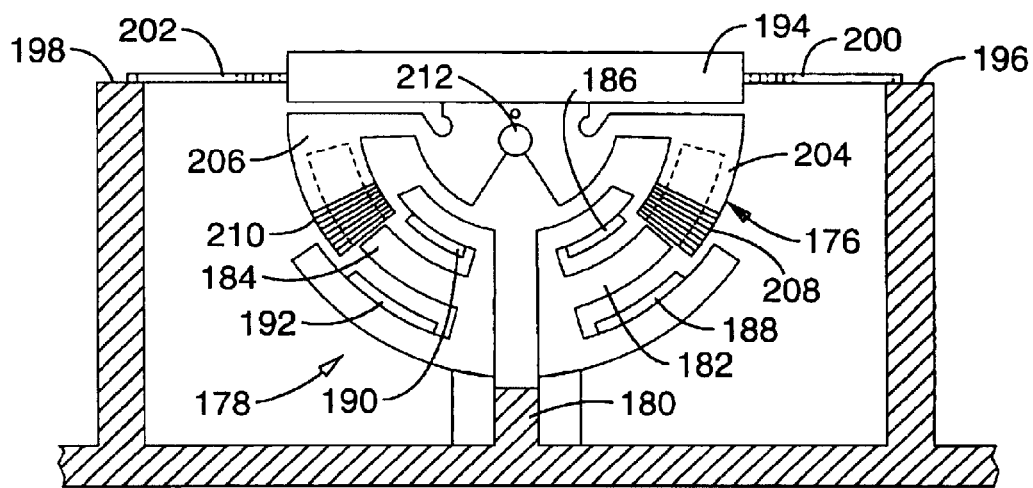
FIG. 41 is a side view in partial cross section of an embodiment of a reflector assembly according to the present invention employing a clamshell-style bobbin shown in the open position prior to assembly.
Figure 42:
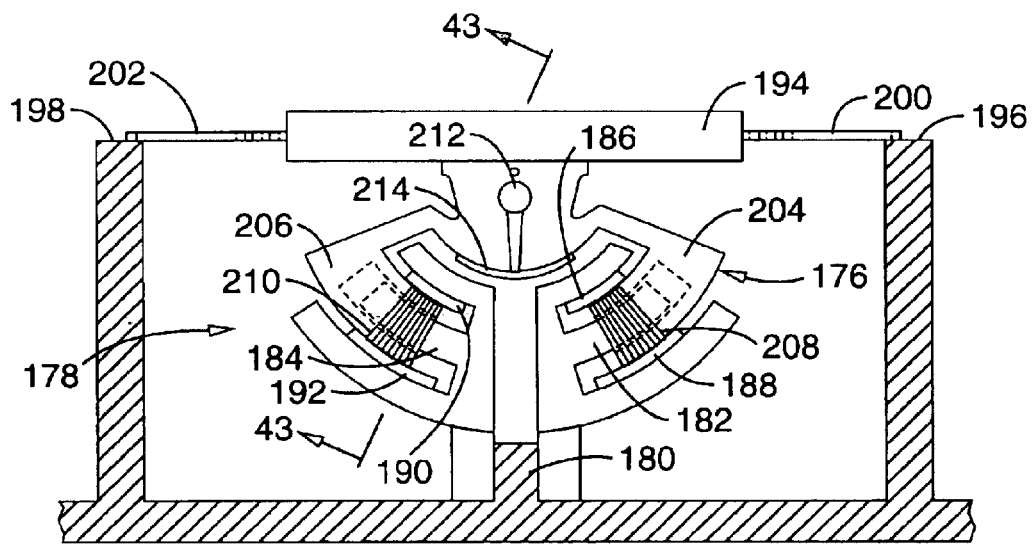
FIG. 42 is a side view in partial cross section of the reflector assembly of FIG. 41 with the bobbin shown in the closed position after assembly.
Figure 43:
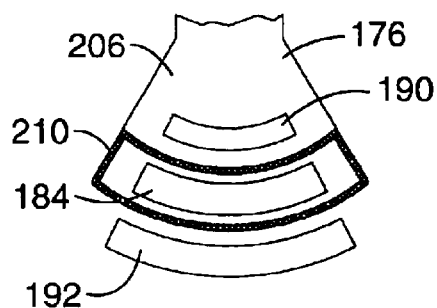
FIG. 43 is a partial cross sectional view of the bobbin and base assembly shown in FIG. 42 taken through lines 43—43.

Referring now to FIG. 41 through FIG. 43, a clamshell-type bobbin 176 is shown as a further alternative embodiment. In this embodiment, a stationary lower magnet and yoke assembly 178 is held in place by a support post 180. The assembly shown comprises a pair of yokes 182, 184, a pair of magnets 186,188 associated with yoke 182 and a pair of magnets 190, 192 associated with yoke 184. Bobbin 176 and an associated mirror mount 194 are suspended from posts 196, 198 by, for example, wire springs 200, 202 shown as having a rectangular cross section, or wire springs having the same or similar configuration to wires 68 previously described. In addition, bobbin 176 includes hollow coil support arms 204, 206 around which coils 208, 210 are wound, respectively, and which receive yokes 182, 184, respectively. Note that the interiors of coil support arms 204, 206 are oversized in relation to yokes 182, 184 to allow side-to-side movement of the yokes therewithin. Bobbin 176 has an open position as shown in FIG. 41 and a dosed position as shown in FIG. 42. The open position shown in FIG. 41 is used only for assembly purposes. During assembly, once the coil support arms are aligned with the yokes, bobbin 176 is crimped or otherwise squeezed in relation to a flexible hinge 212 into the dosed position shown in FIG. 42. As can be seen from FIG. 42, yokes 182, 184 are positioned within coil support arms 204, 206, respectively. At this point, bobbin 176 is laser welded or the like in the area of hinge 212 to create a weld 214 that retains the bobbin in the closed position for operation. Referring to FIG. 41 and FIG. 41, it can be seen that bobbin 176 can rotate in relation to a first axis (e.g., yokes 182, 184 moving into and out from coil support arms 204, 206, respectively). In addition, it can be seen from FIG. 43 that bobbin 176 can also rotate in relation to a second axis orthogonal to the first axis (e.g., yokes 182, 184 moving side to side within coil support arms 204, 206). As with the previous bobbins described, bobbin 176 is preferably fabricated from plastic or like materials.

Figure 44:
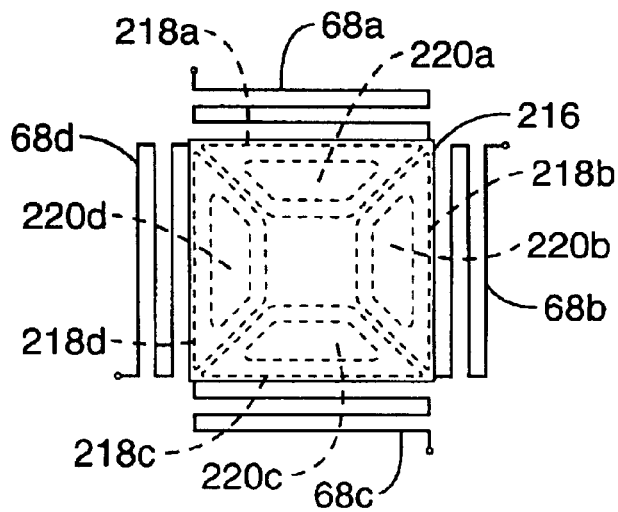
FIG. 44 is a top plan view of an embodiment of a moveable bobbin according to the present invention that is generally flat.
Figure 45:
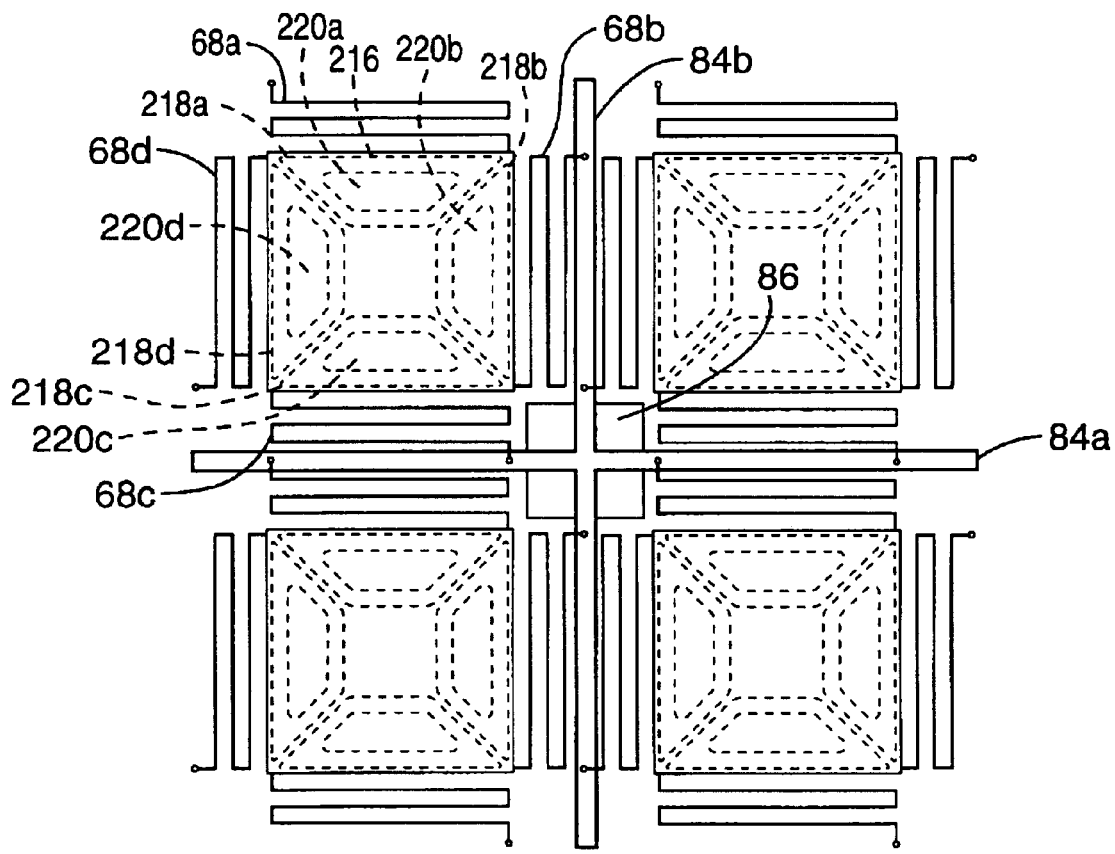
FIG. 45 is a top plan view of an array of the bobbins according to the embodiment of FIG. 44 which are attached to a wire support frame.

Thus far various embodiments of bobbins have been described which are three-dimensional. However, it is also possible to construct a bobbin having a substantially two-dimensional (e.g., flat) configuration. For example, referring to FIG. 44 and FIG. 45, a bobbin 216 is shown which has flat coils 218 attached or printed on its underside in the same manner described above with regard to the coils on the hemispherical-shaped bobbins. Note that the trapezoidal shape of coils 218 is for compactness and other shapes can be used as well. Note also that bobbin 216 would be used in combination with magnets and U-shaped field return plates as, for example, shown in FIG. 3 through FIG. 5, or U-shaped magnets as, for example, shown in FIG. 7 through FIG. 9. Accordingly, holes 220 are placed in bobbin 216 through the interior of coils 218. Since coils 218 are trapezoid shaped, holes 220 as well as any magnet or return plate extending therethrough preferably would also be trapezoid shaped. Also, with the trapezoid shape of coils 218, the portions of the magnets or magnets and return plates that reside outside the bobbin preferably would be trapezoid shaped as well, and would be sufficiently wide to generate flux lines around the widest parts of the coils. In this way, the working portions of the coils are maximized. FIG. 45 shows an array of bobbins 216 and illustrates means for supporting the bobbins by attaching wires 68 to a wire mesh support frame in a pallet as shown in FIG. 13 thereby forming an array of reflector assemblies.

Figure 46:
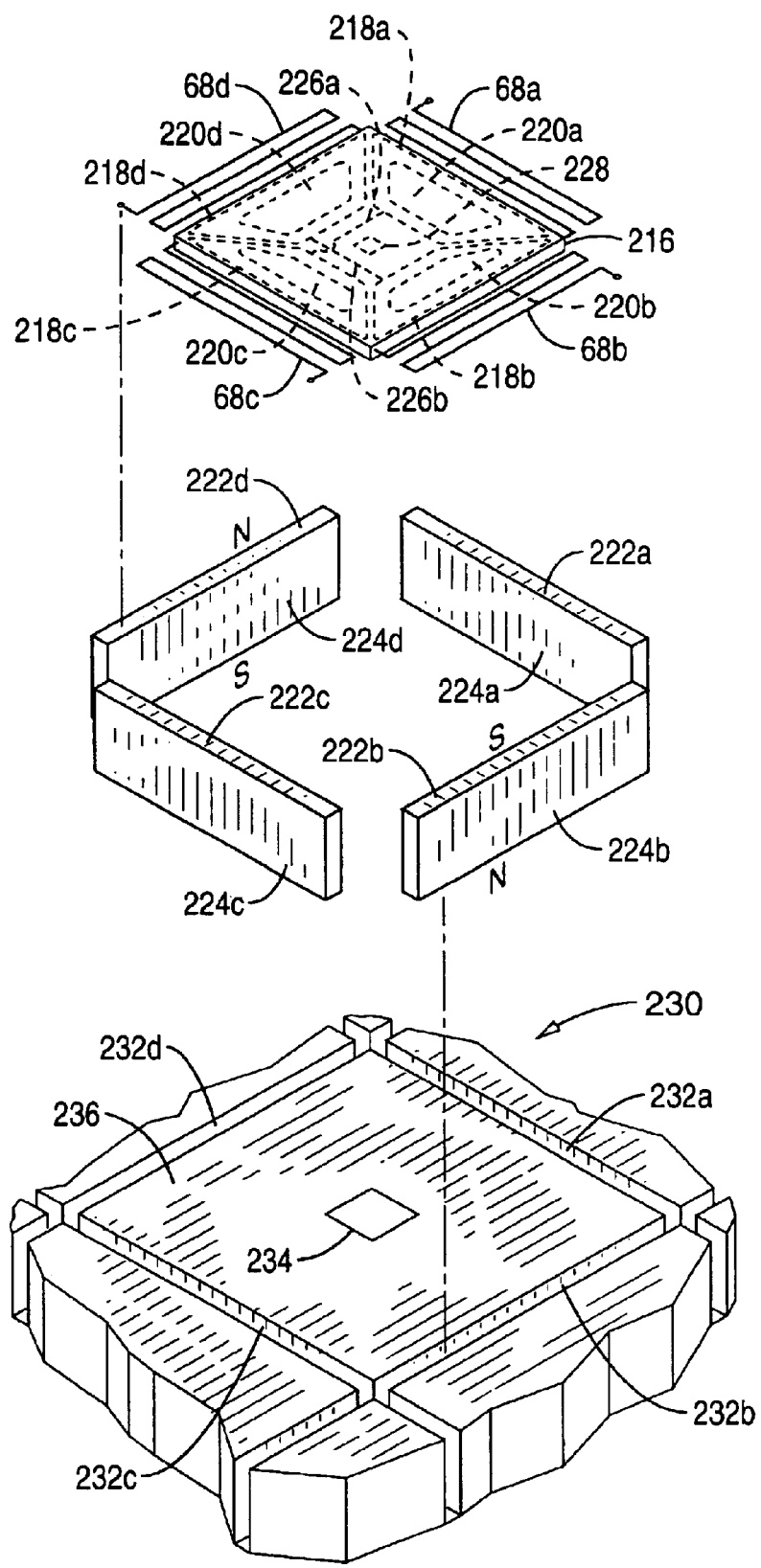
FIG. 46 is an exploded view of a reflector assembly according to an embodiment of the present invention employing a generally flat bobbin and a yokeless magnet configuration mounted on a micromachined base.

It will be appreciated from the various embodiments described thus far that yokes (i.e., field return plates) may or may not be required, depending on the configuration and the positioning of the magnets in relation to the coils. Further, it will be appreciated that the field return plates or magnets may or may not extend through the interior of the coils. All that is required is for the flux lines from the magnet to cut through the coil so that energizing the coil will create opposing lines of flux to effect movement of the bobbin. A further example of a yokeless configuration which, further, does not require the magnets to extend through the coils is shown in FIG. 46 which is an alternative embodiment of the configuration shown in FIG. 44 and FIG. 45. Here, the upper edges 222 of a plurality of strip magnets 224 are positioned beneath bobbin 216 and aligned with the centers of coils 218. Note that opposing pairs of strip magnets 224 have opposite pole orientation. Note also that, due to the configuration of magnets 224, pairs of coils are electrically connected. For example, coils 218a and 218c are electrically connected through interconnection wire 226a and coils 218b and 218d are electrically connected through interconnection wire 226b. This embodiment also illustrates the use of a hologram 228 on the underside of bobbin 216 for position detection.

The embodiment shown in FIG. 26 also illustrates a base 230 having slots 232 for receiving magnets 224. In addition, base 230 includes an opening 234 through which a photo-detector of the like can sense the position of bobbin 216 using hologram 228. The base would comprise a plurality of segments 236, one such segment corresponding to each reflector assembly in the array. The array of reflector assemblies would be supported on a wire frame 84 as shown in FIG. 45 and positioned above base 230. In the preferred embodiment, base 230 is fabricated by cutting or etching grooves 232 into a [100] silicon wafer or the like. Magnets 224 can be fabricated from a wafer or the like that is cut into strips that are then magnetized. Typical materials that can be used include samarium cobalt and neodymium. Once the magnets are installed in the grooves, the assembly would be lapped to form a flat grid. The wire frame holding the matrix of reflector assemblies would then be mounted to the magnet/base assembly.

Figure 47:
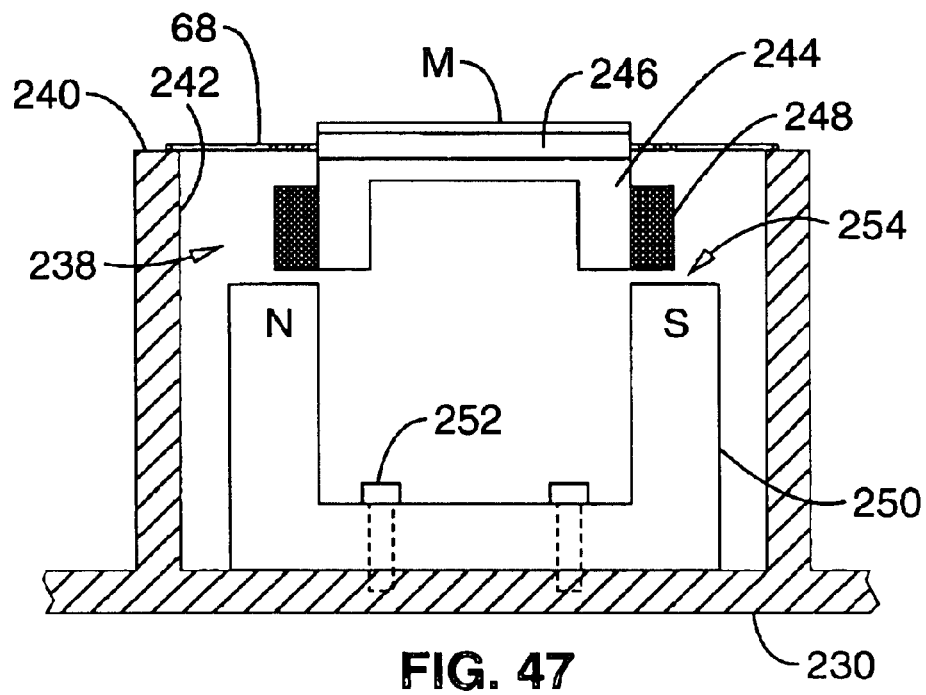
FIG. 47 is a side view in partial cross section of an embodiment of a reflector assembly according to the present invention which employs a bobbin having a single coil.
Figure 48:
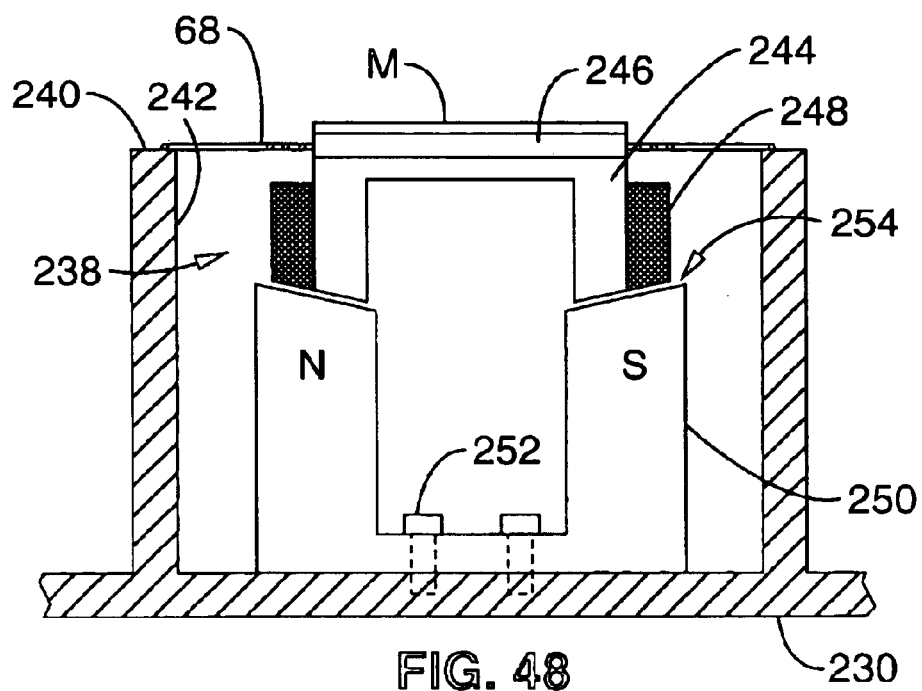
FIG. 48 is a side view in partial cross section of an alternative embodiment of the reflector assembly shown in FIG. 47.
Figure 49:
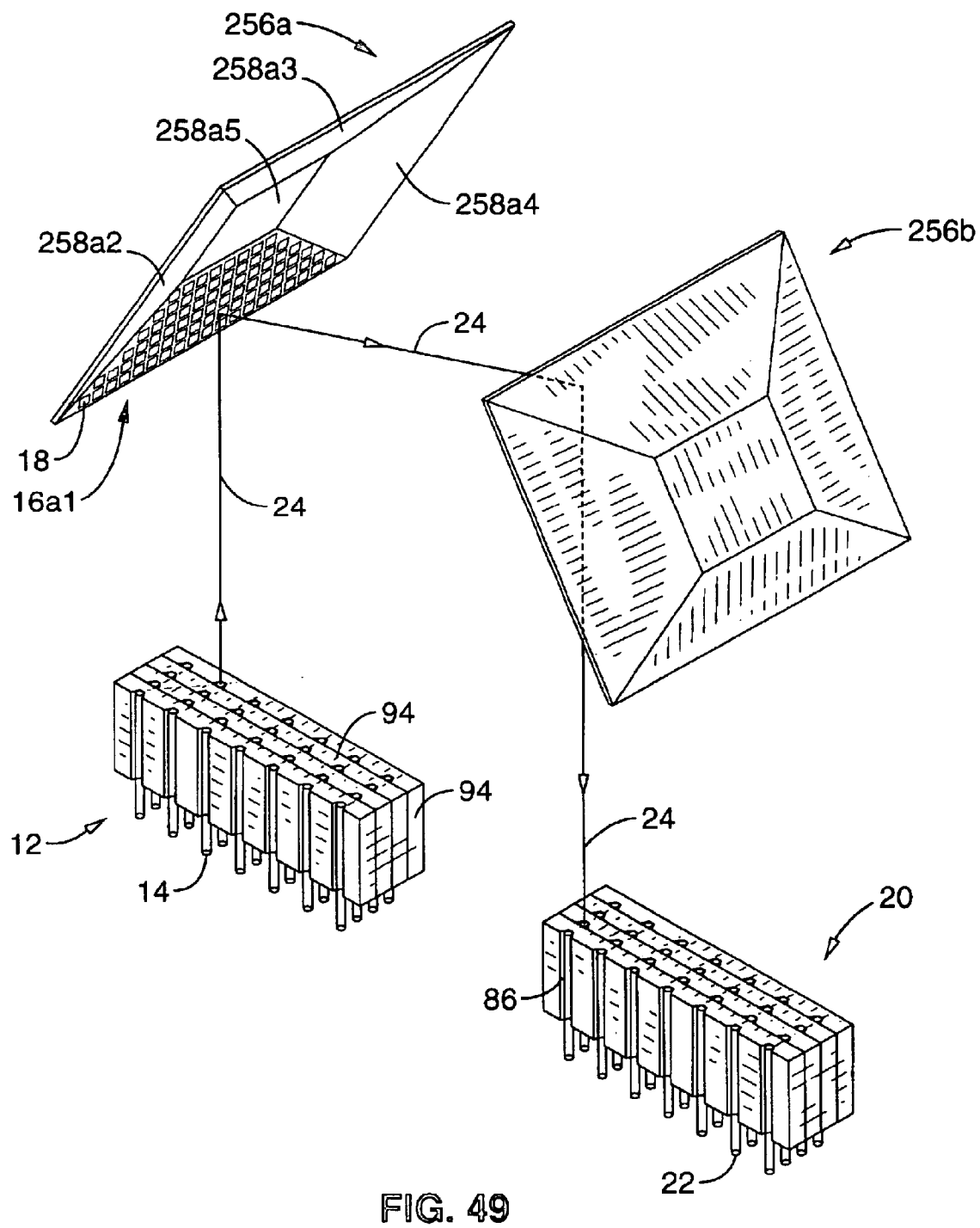
FIG. 49 is a perspective schematic view of an optical cross-connect switch according to an embodiment of the present invention in which reflector pallets with relative tilt angles are configured as elements of a "cupped" array or "super-pallet".
Figure 50:
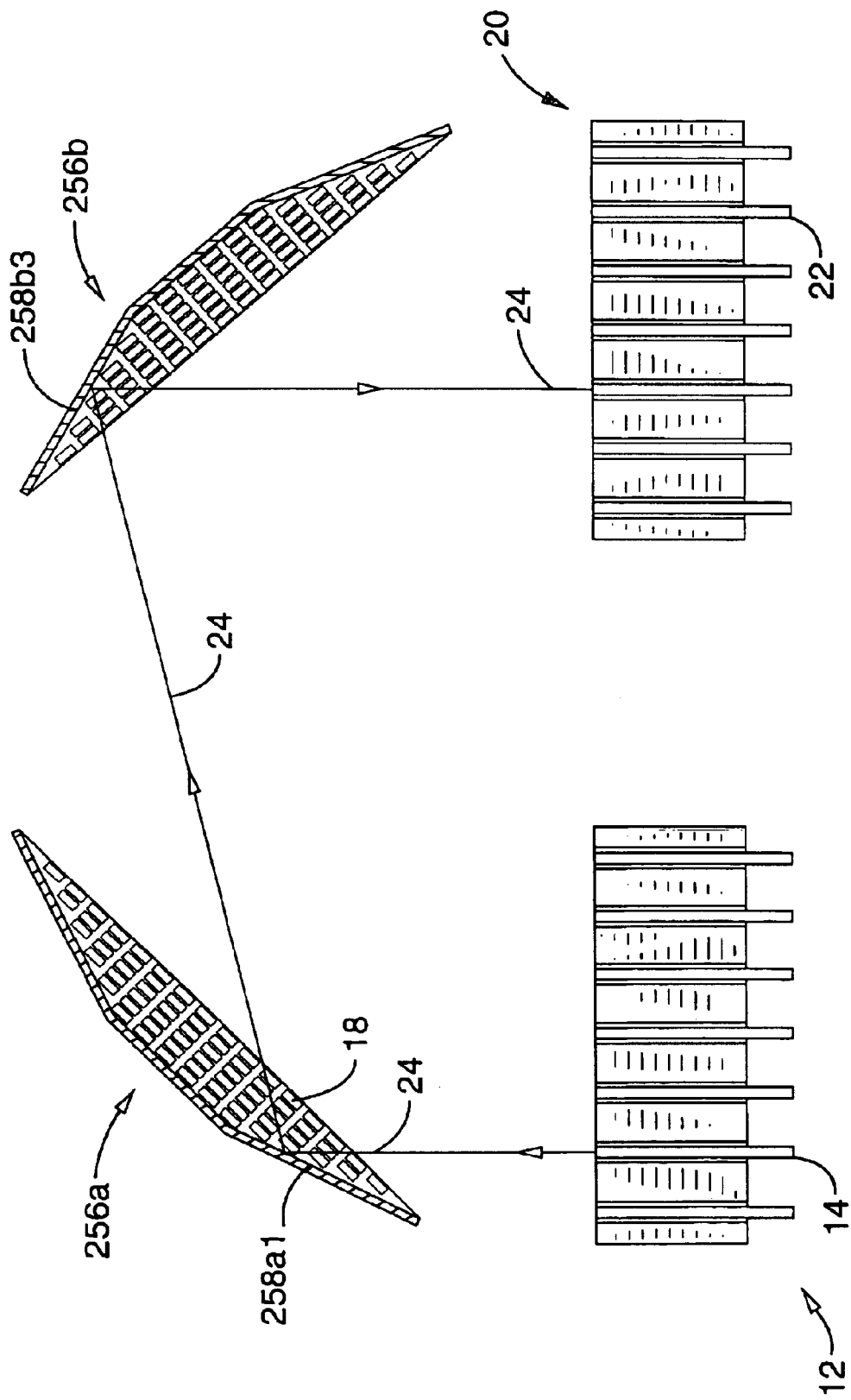
FIG. 50 is a side view of the cross-connect switch shown in FIG. 49.
Figure 51:
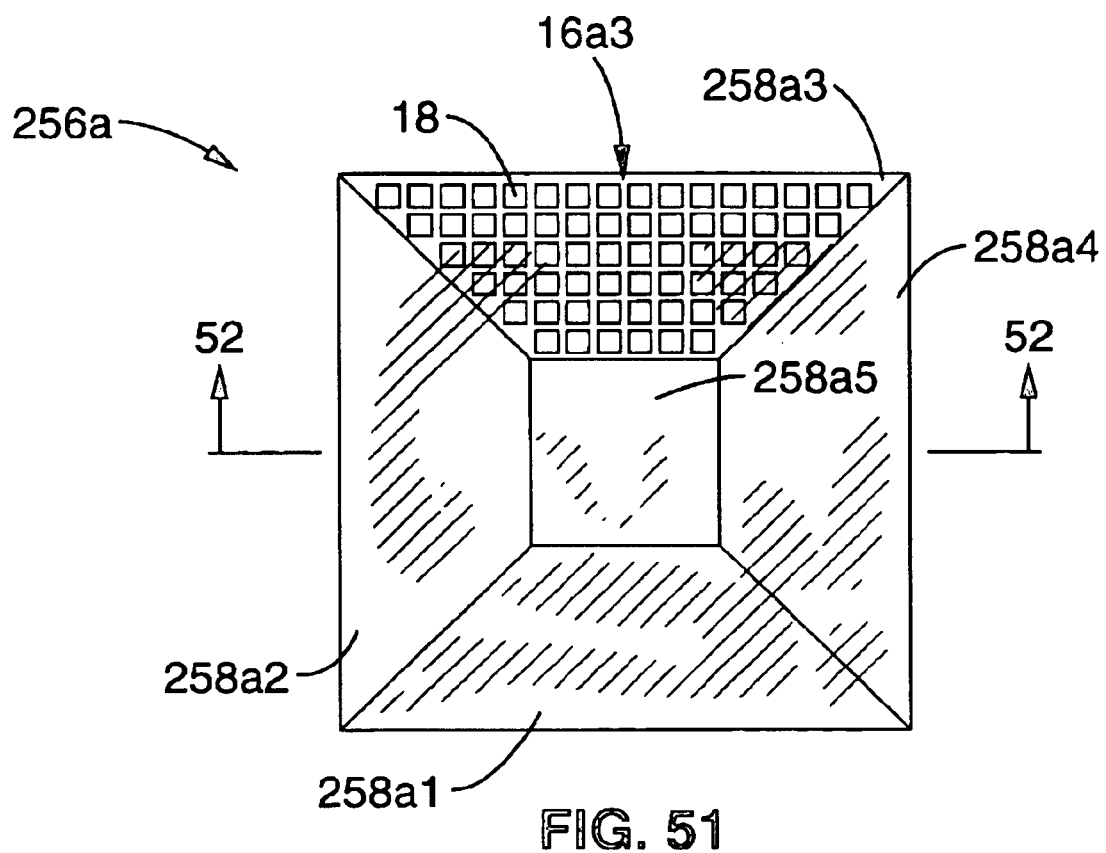
FIG. 51 is a top plan view of a super-pallet shown in FIG. 49.
Figure 52:
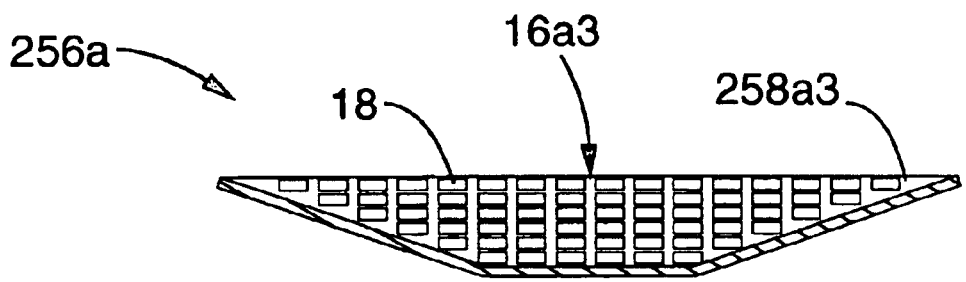
FIG. 52 is a cross sectional view of the super-pallet of FIG. 49 taken through lines 52—52.
Figure 53:
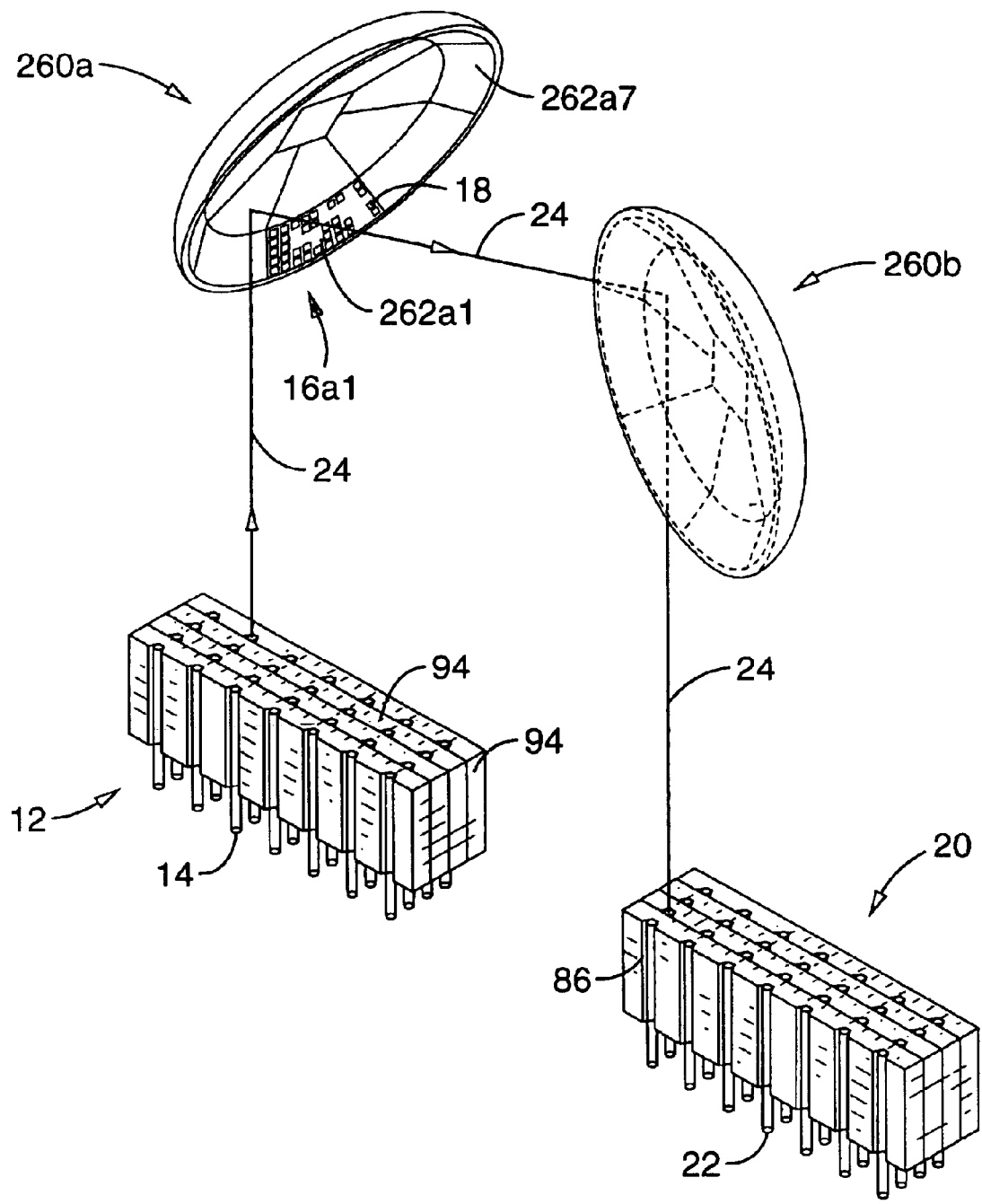
FIG. 53 is a perspective schematic view of an optical cross-connect switch according to an embodiment of the present invention in which reflector pallets with relative tilt angles are configured as elements of a "dome-shaped" array or "super-pallet".
Figure 54:
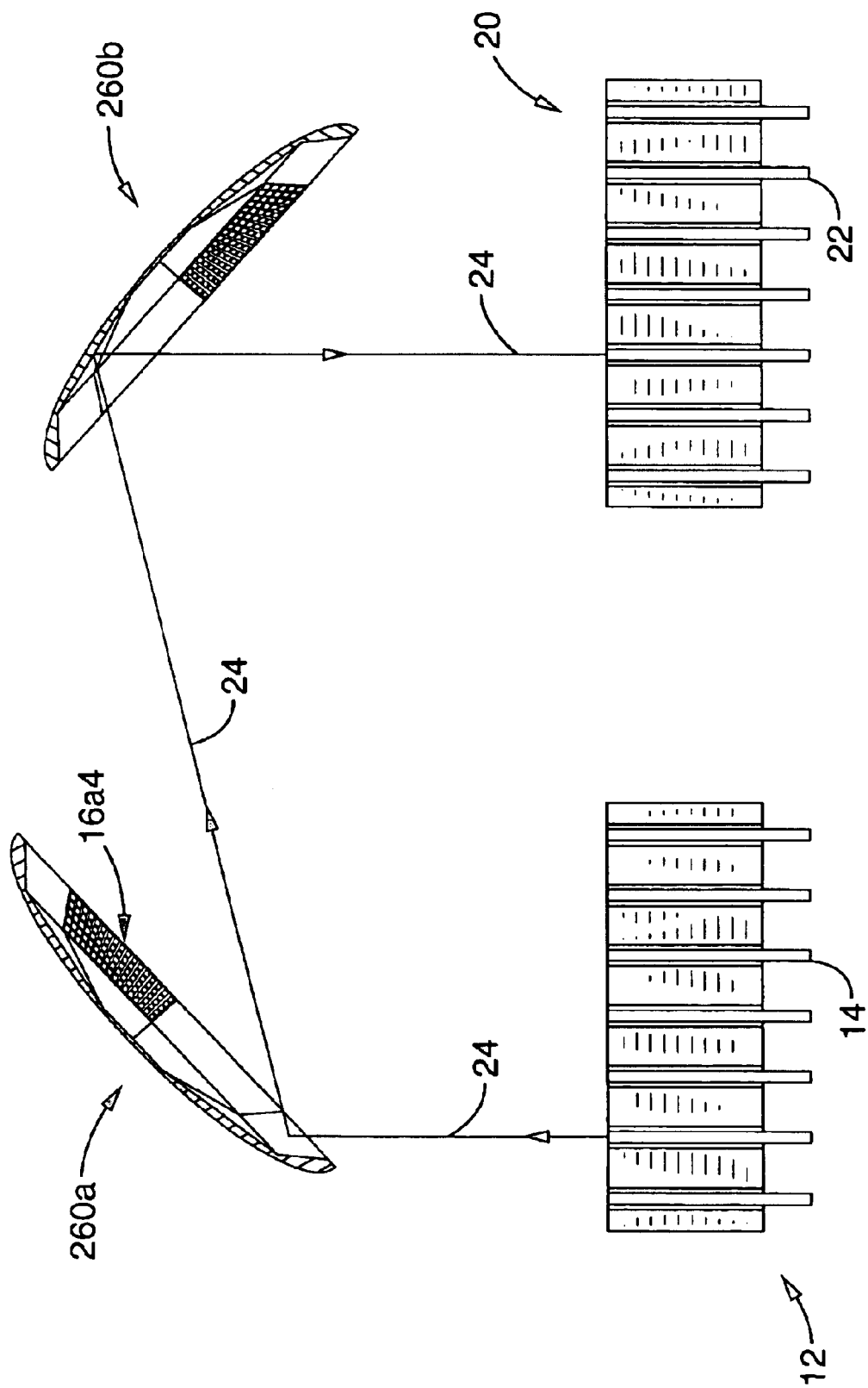
FIG. 54 is a side view of the cross-connect switch shown in FIG. 53.
Figure 55:
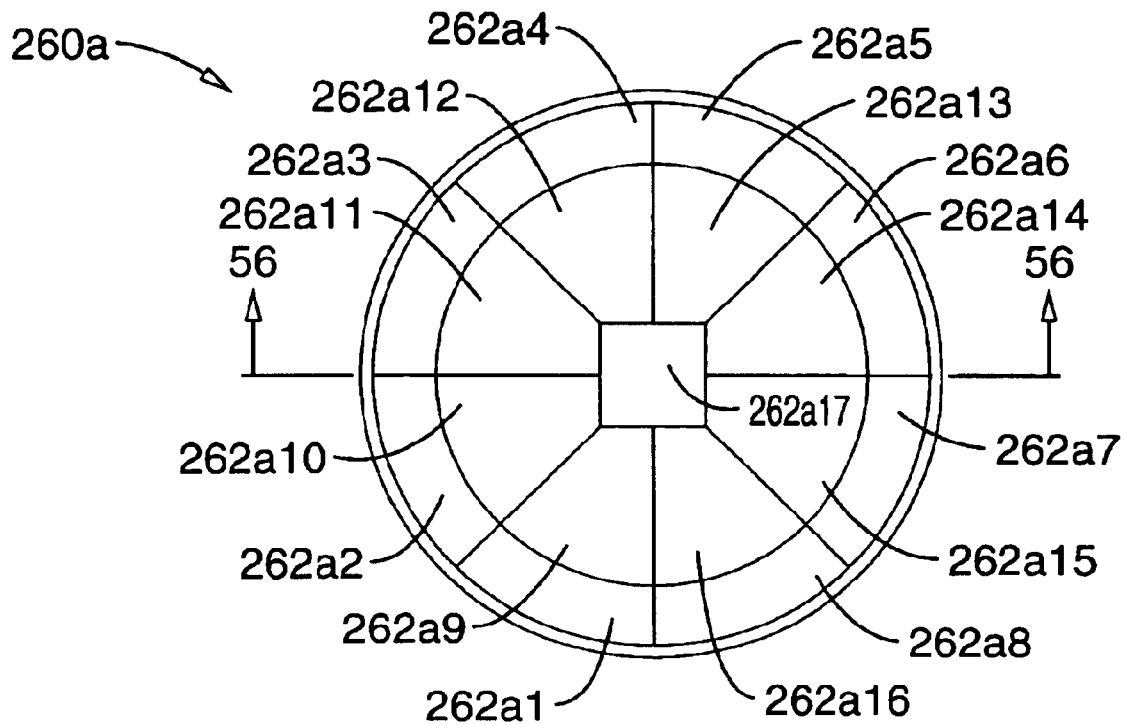
FIG. 55 is a top plan view of a super-pallet shown in FIG. 53.
Figure 56:
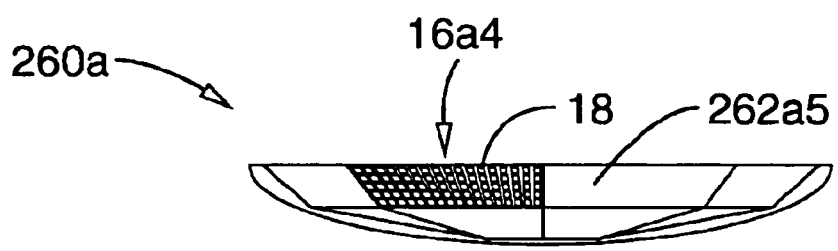
FIG. 56 is a cross sectional view of the super-pallet of FIG. 55 taken through lines 56—56.

Referring to FIG. 47 and FIG. 48, it will also be appreciated that base 230 could alternatively be fabricated with wells or cavities 238 that would receive the bobbins and even the magnets if desirable. Wires supporting the bobbin would be attached to the upper surface 240 of the sidewalls 242 bounding the cavity. This approach can also be applied to the embodiments of FIG. 35 through FIG. 43, for example. In the embodiments of FIG. 35 through FIG. 40, bobbin 152 and magnets 158 would be recessed in the cavity with mirror M being flush with the surface of the base 230. Posts 164 in FIG. 35 through FIG. 38 would in actuality be the upper surfaces of the sidewalls bounding the cavities. A similar configuration would be used for the embodiment shown in FIG. 41 through FIG. 43. The reflector assembly of FIG. 39 and FIG. 40 could also be used with a base having cavities, in which case the posts 174 on magnets 172 would not be necessary since wires 68 would be extended out to attach to the upper surfaces of the sidewalls of the cavities.

FIG. 47 and FIG. 48 also illustrate alternative embodiments of yokeless coil and magnet configurations. In the embodiment of FIG. 47, in which only one-axis of rotation is depicted for simplicity, a square-shaped bobbin 244 carries a mirror mount 246 and mirror M. A coil 248 is wound the entire bobbin 246 rather than separate coils being associated with quadrants of the bobbin. Two quadrants of coil 244 are positioned above the north N and south S poles of a U-shaped magnet 250, respectively, as shown. Magnet 250 is attached to base 230 using pins 252 or other conventional fasters or bonding means. The upper edges 254 of magnet 250 are squared-off and generally parallel to the plane of base 230 as shown. Lines of magnetic flux extend between the poles of magnet 250 and cut through the sections of coil 248. FIG. 48 shows a similar configuration except that upper edges 254 are tapered as shown.

Accordingly, those skilled in the art will appreciate that a wide range of bobbin configurations, mirror mounts, support structures, magnet and/or yoke configurations, base configurations, assembly techniques and the like can be employed with the present invention and are to limited solely to those described herein. The invention can be embodied in a wide variety of ways depending upon the particular switch configuration desired, constraints on size and compactness, and various other factors. Furthermore, the pallet configuration can be varied as well.

For example, referring again to FIG. 1, both the fiber arrays 12, 20 and the angularly placed mirror pallets 16a, 16b can be rectangular in shape as shown. Alternatively, mirror pallets 16 could be made rectangular such that a square array of fibers in a bundle could be used to maximize the number of fibers, thereby improving the use of available space. Note that either the fiber array can be square or the pallet can be square, but not both. Furthermore, in the case of round mirrors, the mirror pallet can be elliptical-shaped with a round array of fibers. From a switching mode perspective, a round or square mirror is still optimal, and either configuration can be employed in the present invention.

Referring also to FIG. 49 through FIG. 56, as an extension of using a two-axis mirror array (e.g., pallet 16a) placed in one plane as previously described and shown in FIG. 1, those skilled in the art will appreciate that additional arrays could be used and placed in different planes, to make a multidimensional array. For example, as shown in FIG. 49 through FIG. 52, a plurality of reflector pallets 16 as heretofore described can be assembled into an array of pallets or a "super-pallet" 256 having multiple segments or planes 258, such that a relative angle of tilt exists between each reflector pallet.

FIG. 49 through FIG. 52 illustrate a super-pallet 256 that has five segments 258a1 through 258a5 and, therefore, five mirror pallets 16a1 through 16a5, respectively. Typically the number of pallets will range from approximately five to approximately twenty with the number of mirrors in each pallet ranging up to approximately 128×128. By arranging each reflector pallet 16, which serves as an element of the super-pallet 256, with a relative angle of tilt with respect to each other, the angular range of operation of each mirror in a mirror module is more balanced about a neutral point. All pallet base planes rest on the "roof top" of the cross-connect switch, with different planes for each pallet, and associated relative angles between planes. The input and output fibers have corresponding fiber to fiber pitches to match the mirror to mirror pitches, whether on the same or different pallet, to form substantially close to a 45 degree incident or exit angle on the mirrors. In this embodiment, the super-pallets 256a, 256b can be made to move in addition to individual reflector assemblies moving. As a result, a mirror in one pallet can be focused not only on a mirror in a corresponding opposing pallet, but also on a mirror in other pallets in the opposing super-pallet. Opposing super-pallets would typically be aligned whereby the center point of a particular pallet in one super-pallet is focused on the center point of a selected pallet in the opposing super-pallet in the quiescent state. The super-pallets would then swing in relation to that quiescent state. The quiescent state focal point could be adjusted by initial tilting of the super-pallets in relation to each other, as well by the amount of curvature in a super-pallet.

Note that super-pallets 256 have a flattened dome-shape in the embodiment shown in FIG. 49 through FIG. 52. FIG. 53 through FIG. 56 show an alternative embodiment with super-pallets 260 having hemispherical shapes with seventeen segments 262a1 through 262a17 to hold seventeen corresponding pallets 16a1 through 16a17, respectively.

Referring now to FIG. 57, an embodiment of the cross-connect switch configuration o f FIG. 1 is shown in which an array of crossed cylindrical microlenses are used for collimation. In the example shown, an array 264 of crossed cylindrical microlenses 266, 268 is positioned adjacent input optic fiber bundle 12 near the ends of the input 14 fibers. In this way, the intersections 270 of the crossed microlenses 266, 268 will collimate the emerging beam 24. Another such array 272 is positioned in front of output optic fiber bundle 20 at the ends of the output fibers 22 to re-focus each beam into an associated fiber. An example such crossed microlenses suitable for use in the present invention is described in U.S. Pat. No. 5,581,414, which is incorporated herein by reference. It will also be appreciated that arrays of crossed cylindrical microlenses can be employed in any of the optical switch configurations shown in FIG. 49 through FIG. 56.

Accordingly, the present invention provides for a practical, area efficient, bi-directional, randomly addressable optical cross-connect switch design that can be manufactured using conventional materials and processes. From the choice of materials and processes, the mirror assemblies lend themselves to batch processing for mass production. Alternatively, an elliptical-shaped mirror can be used.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it Is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A mirror assembly for an optical cross-connect switch comprising:
   (a) a movable non-MEMS mirror having substantially non-silicon reflective surface; and
   (b) means for electromechanically moving said mirror to steer an optical beam in two-dimensional space,
   wherein said mirror is coupled to a support member and is moveable in two dimensions in relation to said support member, and
   wherein said mirror is coupled to said support member by a flexible wire.

2. A mirror assembly for an optical cross-connect switch, comprising:
   (a) a moveable non-MEMS mirror having substantially non-silicon reflective surfaces; and
   (b) means for electromechanically moving said mirror to steer an optical beam in two-dimensional space,
   wherein said mirror is coupled to a first support member, wherein said first support member is coupled to a second support member, wherein said mirror is moveable in relation to said first support member around a first axis, wherein said first support member is moveable in relation to said second support member around a second axis substantially perpendicular to said first axis and wherein said mirror is suspended in relation to said first support member by a flexible wire and wherein said first support member is suspended in relation to said second support member by a flexible wire.

3. A mirror assembly as recited in claim 2, wherein each said wire has a serpentine shape.

4. A mirror assembly for an optical cross-connect switch, comprising:
   (a) a moveable non-MEMS mirror having substantially non-silicon reflective surfaces; and
   (b) means for electromechanically moving said mirror to steer an optical beam in two-dimensional space,
   wherein said mirror is coupled to a first support member, wherein said first support member is coupled to a second support member, wherein said mirror is moveable in relation to said first support member around a first axis, wherein said first support member is moveable in relation to said second support member around a second axis substantially perpendicular to said first axis and wherein said means for moving said mirror comprises at least one coil associated with said first support member and at least one magnet associated with said second support member, and wherein energizing said coil applies rotational torque to said first support member in relation to said second support member.

5. A mirror assembly for an optical cross-connect switch, comprising:
   (a) a moveable non-MEMS mirror having substantially non-silicon reflective surfaces; and
   (b) means for electromechanically moving said mirror to steer an optical beam in two-dimensional space, wherein said means for moving said mirror comprises:
   at least one coil coupled to said mirror; and a magnet associated with said coil and positioned to form a magnetic field for said coil.

6. A mirror assembly as recited in claim 5, wherein a force is exerted on said mirror causing said mirror to move when said coil is energized.

7. A mirror assembly for an optical cross-connect switch, comprising:
   (a) a moveable non-MEMS mirror having substantially non-silicon reflective surfaces; and
   (b) means for electromechanically moving said mirror to steer an optical beam in two-dimensional space wherein said means for moving said mirror comprises:
   a plurality of coils of curved or straight shapes coupled to said mirror and positioned around the circumference of a circle coaxial with said mirror; and a plurality of magnets positioned to form a circular magnetic field for said coils.

8. A mirror assembly for an optical cross-connect switch, comprising:
   (a) a moveable non-MEMS mirror having substantially non-silicon reflective surfaces; and
   (b) means for electromechanically moving said mirror to steer an optical beam in two-dimensional space, wherein said means for moving said mirror comprises:
   a plurality of coils of curved or straight shapes coupled to said mirror and positioned around the circumference of a circle coaxial with the mirror; and a plurality of driving magnets having magnetic pole surfaces forming part of a hemisphere around the coils.

9. A mirror assembly for an optical cross-connect switch, comprising:
   (a) a moveable non-MEMS mirror having substantially non-silicon reflective surfaces; and
   (b) at least one coil coupled to each said mirror; and
   (c) at least one magnet associated with each coil and positioned for forming a magnetic field for said coil.

10. A mirror assembly as recited in claim 9, wherein said mirror is coupled to a support member and is moveable in two dimensions in relation to said support member.

11. A mirror assembly as recited in claim 10, wherein said mirror is coupled to said support member by a flexible wire.

12. An optical cross-connect switch as recited in claim 11, wherein said wire has a serpentine shape.

13. A mirror assembly as recited in claim 9, wherein said mirror is coupled to a first support member, wherein said first support member is coupled to a second support member, wherein said mirror is moveable in relation to said first support member around a first axis, and wherein said first support member is moveable in relation to said second support member around a second axis substantially perpendicular to said first axis.

14. A mirror assembly as recited in claim 13, wherein said mirror is suspended in relation to said first support member by a flexible wire and wherein said first support member is suspended in relation to said second support member by a flexible wire.

15. A mirror assembly as recited in claim 14, wherein each said wire has a serpentine shape.

* * * * *